(12) United States Patent
Miyazaki et al.

(10) Patent No.: US 11,860,559 B2
(45) Date of Patent: Jan. 2, 2024

(54) TEMPERATURE SENSOR, TEMPERATURE DETECTION DEVICE, AND IMAGE FORMING APPARATUS

(71) Applicant: SHIBAURA ELECTRONICS CO., LTD., Saitama (JP)

(72) Inventors: Hiroki Miyazaki, Saitama (JP); Morihisa Hamada, Saitama (JP); Yuki Ishii, Saitama (JP); Yuri Okada, Saitama (JP); Ryota Murakoshi, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 18/068,230

(22) Filed: Dec. 19, 2022

(65) Prior Publication Data
US 2023/0244163 A1    Aug. 3, 2023

(30) Foreign Application Priority Data

Jan. 28, 2022 (JP) ................. 2022-011377

(51) Int. Cl.
*G03G 15/20* (2006.01)
*G01K 7/18* (2006.01)
*G01K 1/16* (2006.01)

(52) U.S. Cl.
CPC ............ *G03G 15/205* (2013.01); *G01K 1/16* (2013.01); *G01K 7/18* (2013.01)

(58) Field of Classification Search
CPC ........ G03G 15/20; G03G 15/205; G01K 1/16; G01K 7/18
USPC ........................................... 399/69
See application file for complete search history.

(56) References Cited

FOREIGN PATENT DOCUMENTS

| JP | 2002122489 A | | 4/2002 |
|---|---|---|---|
| JP | 2004053398 | * | 2/2004 |
| JP | 2004060765 | * | 2/2004 |

* cited by examiner

*Primary Examiner* — Hoan H Tran
(74) *Attorney, Agent, or Firm* — Pearne & Gordon LLP

(57) ABSTRACT

There are provided a temperature sensor that has following capability to a temperature measurement object and has excellent responsiveness, and a temperature detection device and an image forming apparatus each including the temperature sensor. A temperature sensor used in contact with a temperature measurement object, includes: a thermosensitive element configured to detect a temperature of the temperature measurement object; a heat collection member including an abutting portion configured to abut on the temperature measurement object, and configured to be thermally joined with the thermosensitive element; and a holding member including a housing portion configured to house the heat collection member. The heat collection member is swingably held by the holding member, to maintain a state where the abutting portion abuts on the temperature measurement object.

17 Claims, 17 Drawing Sheets

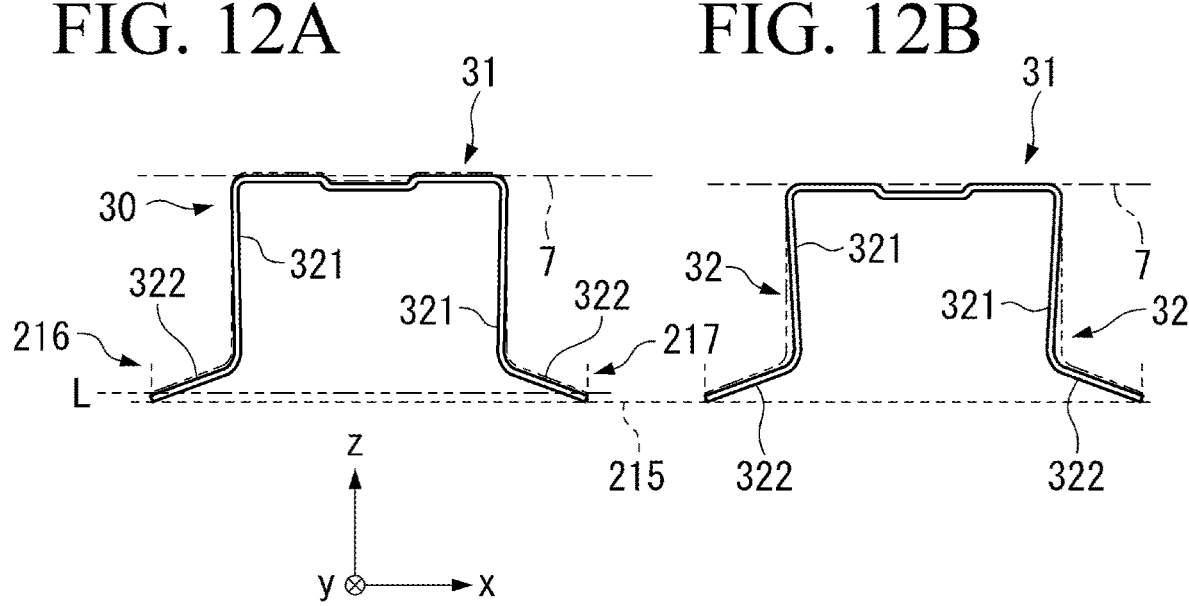
FIG. 12A
FIG. 12B
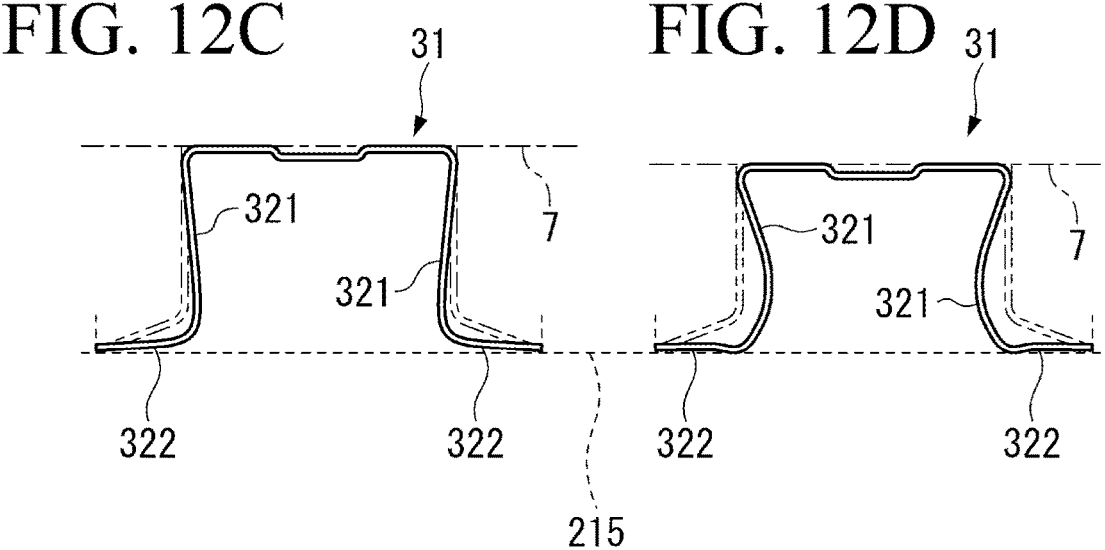
FIG. 12C
FIG. 12D

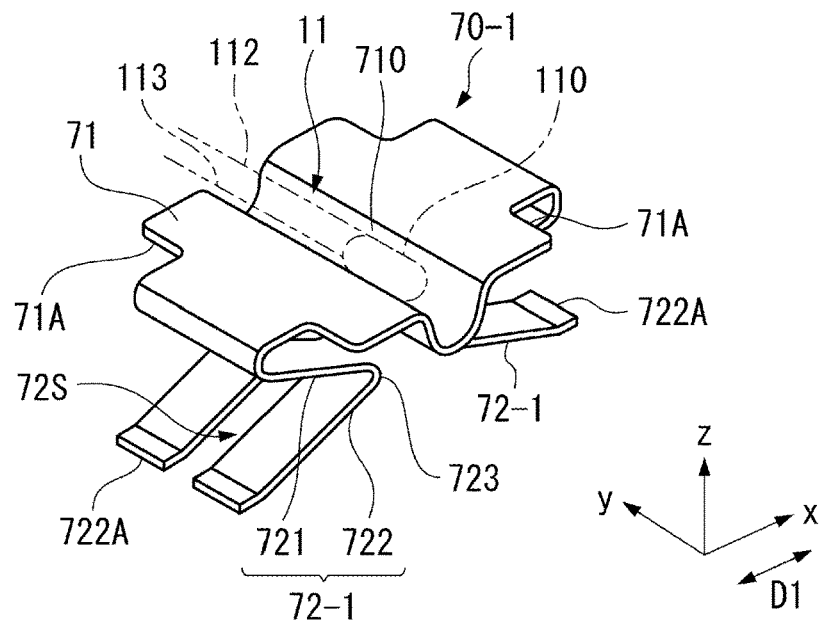
FIG. 16A
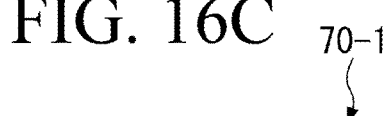
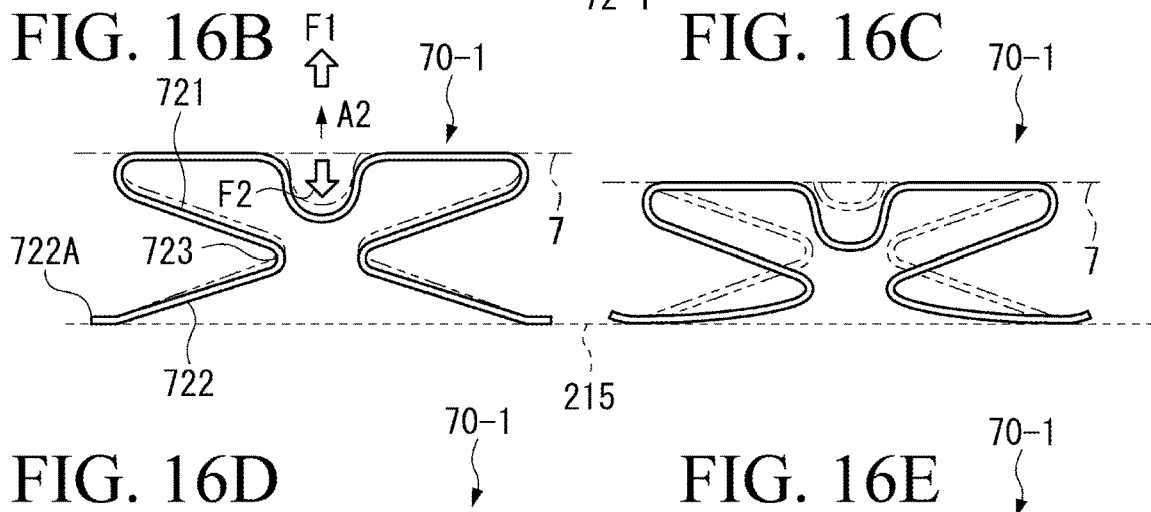
FIG. 16B
FIG. 16C
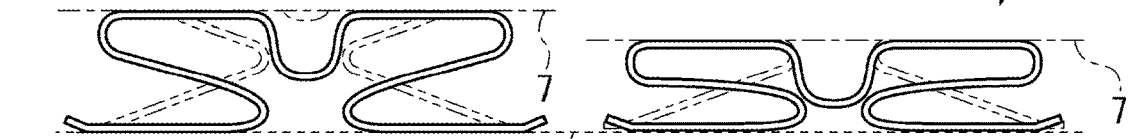
FIG. 16D
FIG. 16E
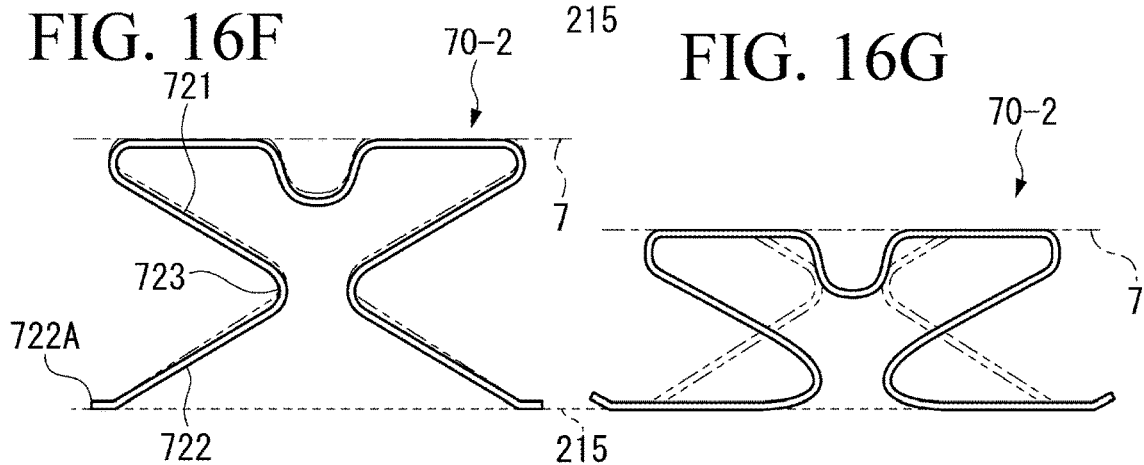
FIG. 16F
FIG. 16G

TEMPERATURE SENSOR, TEMPERATURE DETECTION DEVICE, AND IMAGE FORMING APPARATUS

CROSS-REFERENCE TO RELATED APPLICATIONS

This application claims priority from Japanese Patent Application No. 2022-011377 filed on Jan. 28, 2022. The content of this application is incorporated herein by reference in its entirety.

BACKGROUND OF THE INVENTION

Field of the Invention

The present invention relates to a temperature sensor detecting a temperature of a temperature measurement object, a temperature detection device including the temperature sensor, and an image forming apparatus including the temperature sensor.

Description of the Related Art

A temperature detection device is known that is disposed in contact with a heater provided in a heat fixing roller of an image forming apparatus such as a printer using an electrophotographic process in order to control a temperature of the roller (for example, JP 2002-122489 A).

The temperature detection device disclosed in JP 2002-122489 A includes a temperature detection element, a sensor main body in which conductive members conducting lead wires of the temperature detection element and covered electric wires of a circuit unit are insert-molded, and a heat-resistant elastic body interposed between the sensor main body and the temperature detection element. A coil spring is disposed between the sensor main body and a supporting body. The temperature detection element is pressed against the heater by elastic force of the coil spring and elastic force of the heat-resistant elastic body. As the heat-resistant elastic body, a ceramic paper made of inorganic fibers is commonly used.

In recent years, a temperature sensor not using the ceramic paper is desired. Further, the temperature sensor is required to have following capability to the temperature measurement object in consideration of dimensional tolerance and assembly tolerance of each of the temperature sensor and the temperature measurement object.

An objective of the present invention is to provide a temperature sensor that has following capability to a temperature measurement object and has excellent responsiveness, and a temperature detection device and an image forming apparatus each including the temperature sensor.

SUMMARY OF THE INVENTION

According to the present invention, a temperature sensor used in contact with a temperature measurement object, includes: a thermosensitive element configured to detect a temperature of the temperature measurement object; a heat collection member including an abutting portion configured to abut on the temperature measurement object, and configured to be thermally joined with the thermosensitive element; and a holding member including a housing portion configured to house the heat collection member.

The heat collection member is swingably held by the holding member, to maintain a state where the abutting portion abuts on the temperature measurement object.

In the temperature sensor according to the present invention, the heat collection member preferably includes the abutting portion, and paired leg portions formed integrally with the abutting portion and having tip end parts abutting on an inner surface of the housing portion formed in a concave shape.

In the temperature sensor according to the present invention, the housing portion preferably includes a bottom part facing the abutting portion, and a side wall erecting from an end of the bottom part toward the abutting portion, and the tip end parts of the paired leg portions are preferably disposed at corners formed by the bottom part and the side wall.

In the temperature sensor according to the present invention, the abutting portion and the paired leg portions are preferably formed in a substantially U-shape as a whole by bending both sides in a longitudinal direction of a substantially rectangular metal plate, and the tip end parts are each preferably formed in an arc shape.

In the temperature sensor according to the present invention, each of the paired leg portions preferably includes a leg portion main body bent relative to the abutting portion, and the tip end part bent relative to the leg portion main body in a direction opposite to a direction in which the leg portion main body is bent.

In the temperature sensor according to the present invention, the abutting portion is preferably provided with an element arrangement portion where the thermosensitive element is disposed.

In the temperature sensor according to the present invention, the thermosensitive element preferably includes a thermosensitive body as a main body of the thermosensitive element, and paired electric wires electrically connected to the thermosensitive body, and the element arrangement portion preferably includes a thermosensitive body arrangement portion where the thermosensitive body is disposed, and an electric wire arrangement portion where the paired electric wires are disposed.

In the temperature sensor according to the present invention, the abutting portion preferably includes the thermosensitive body arrangement portion including a through hole formed in a metal plate, and the electric wire arrangement portion including a groove formed in the metal plate.

The temperature sensor according to the present invention further includes an inner film having insulation property, between the heat collection member and the temperature measurement object. The thermosensitive element is preferably disposed between the inner film and the temperature measurement object.

The temperature sensor according to the present invention further includes an outer film having insulation property, between the heat collection member and the temperature measurement object. The thermosensitive element is preferably disposed between the inner film and the outer film.

A temperature detection device according to the present invention includes: the above-described temperature sensor; and a circuit unit electrically connected to the temperature sensor, and configured to calculate a temperature of the temperature measurement object based on a signal from the temperature sensor.

An image forming apparatus of an electrophotographic system according to the present invention, includes: a fuser configured to fix toner to a recording medium by heating and pressurization; and the above-described temperature sensor according to any one of claims 1 to 10 configured to detect a temperature of a member provided in the fuser.

In the present invention, to secure strength against a use condition where heat and a load are applied at the same time and following capability of the heat collection member to the temperature measurement object, the leg portions, elastic deformation of which is not expected, include the swingable tip end parts while the spring member or the like pressing the abutting portion against the temperature measurement object is used.

As a result, by the heat collection member that is downsized and has strength, it is possible to provide the small temperature sensor that has durability against creep deformation and following capability to the temperature measurement object.

Further, the heat collection member is thermally joined with the thermosensitive element, which rapidly transfers, to the thermosensitive element, heat input from the temperature measurement object to the heat collection member. Such heat collection action and heat insulation action by a space present in the holding member holding the heat collection member make it possible to sufficiently keep the heat in the thermosensitive element. Accordingly, it is possible to realize excellent responsiveness that a detection temperature by the thermosensitive element immediately follows temperature variation of the temperature measurement object.

BRIEF DESCRIPTION OF THE DRAWINGS

FIGS. 12A to 12D are diagrams illustrating a state where a shape of the heat collection member is deformed with increase in a deformation amount of the heat collection member;

FIG. 16A is a perspective view illustrating a heat collection member according to another modification, FIGS. 16B to 16E are diagrams illustrating a state where a shape of the heat collection member is deformed with increase in a deformation amount of the heat collection member, and FIGS. 16F and 16G each illustrate an example in which lengths and heights of leg portions are increased.

DETAILED DESCRIPTION OF THE PREFERRED EMBODIMENT

An embodiment (FIG. 1 to FIG. 12) of the present invention is described below with reference to accompanying drawings.

EMBODIMENT

[Schematic Configurations of Temperature Detection Device and Temperature Sensor]

Figure 1:
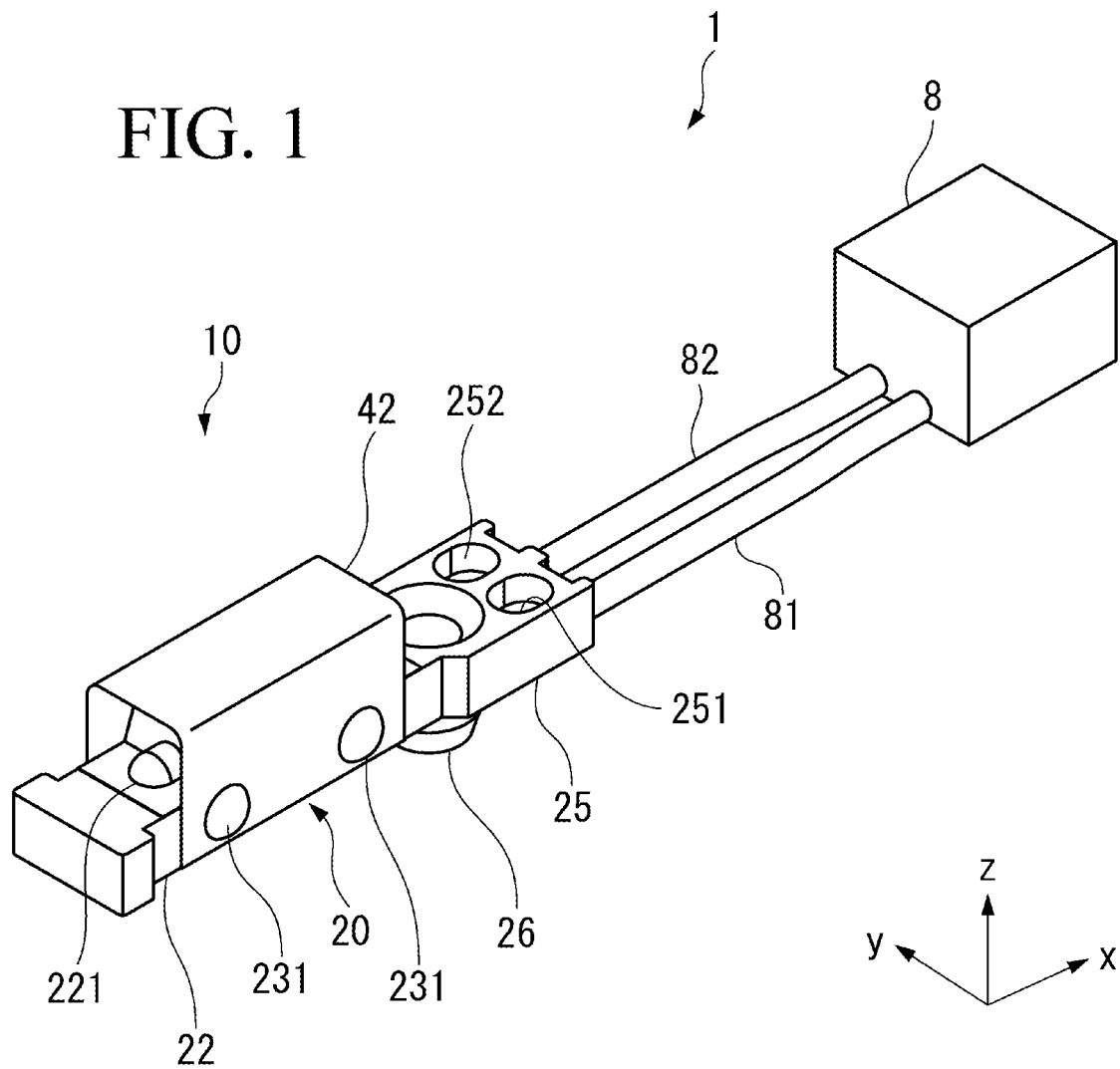
FIG. 1 is a perspective view illustrating a temperature detection device according to an embodiment of the present invention.
Figure 2A:
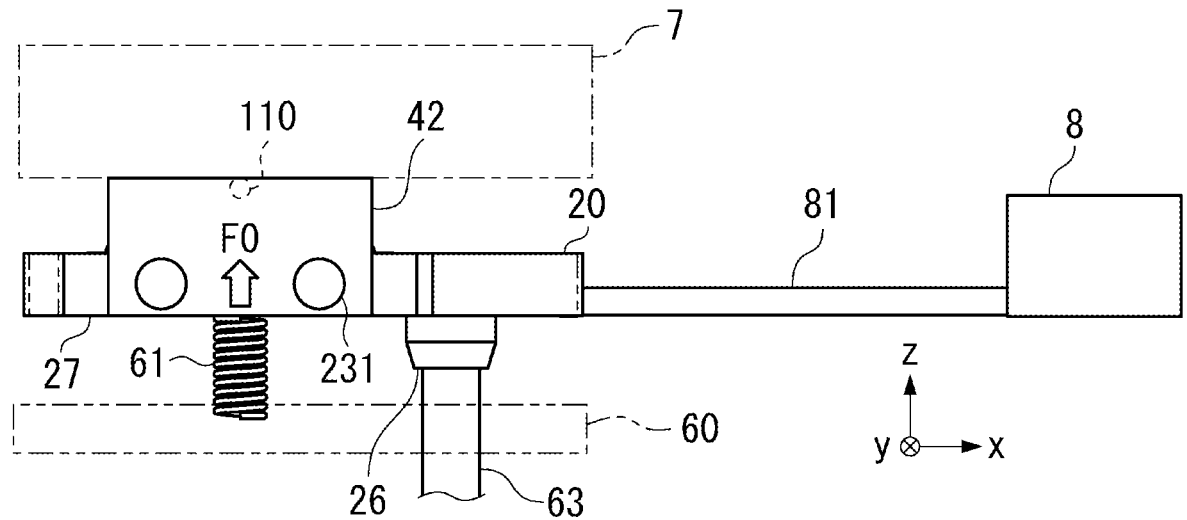
FIGS. 2A and 2B are side views each illustrating a state where a temperature sensor of the temperature detection device illustrated in FIG. 1 is pressed against a temperature measurement object.
Figure 2B:
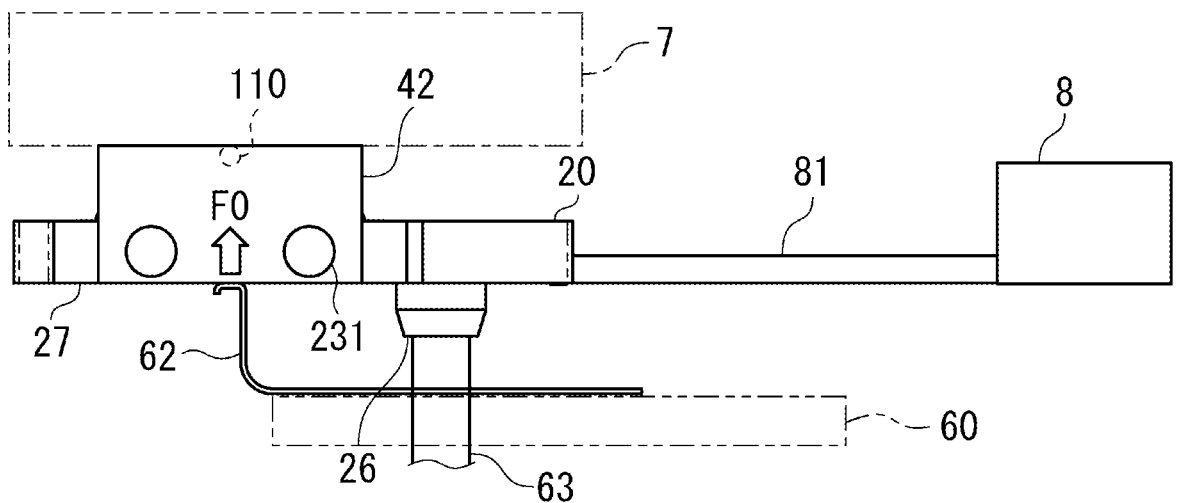

Schematic configurations of a temperature detection device 1 and a temperature sensor 10 according to the present invention are descried with reference to FIG. 1 and FIGS. 2A, 2B. As illustrated in FIG. 1, the temperature detection device 1 includes the temperature sensor 10, a circuit unit 8, and electric wires 81 and 82 electrically connecting the temperature sensor 10 and the circuit unit 8.

The temperature sensor 10 is used to detect a temperature of a temperature measurement object, for example, a roller including a heater, provided in an image forming apparatus such as a laser printer. As illustrated in FIGS. 2A, 2B, the temperature sensor 10 is disposed at a position facing a temperature measurement object 7 in a state of being pressed against the temperature measurement object 7 with necessary pressure.

The circuit unit 8 calculates a temperature of the temperature measurement object 7 based on an electric signal output from the temperature sensor 10. The circuit unit 8 is electrically connected to the temperature sensor 10 through the electric wires 81 and 82 drawn out from a holding member 20.

In the following, a direction in which the electric wires 81 and 82 are drawn out from the holding member 20 is defined as an x-direction. The x-direction corresponds to a longitudinal direction of the temperature sensor 10. In a planar view of the temperature sensor 10, a direction orthogonal to the x-direction is defined as a y-direction.

Further, a direction orthogonal to both of the x-direction and the y-direction is defined as a z-direction. In the z-direction, a side provided with the temperature measurement object 7 is referred to as an "upper side", and a side opposite thereto is referred to as a "lower side".

As illustrated in FIG. 2A, the temperature sensor 10 is disposed in, for example, a supporting member 60 provided in the image forming apparatus through a coil spring 61. More specifically, the holding member 20 of the temperature sensor 10 is disposed on the supporting member 60 through the coil spring 61 in a state where a pin 63 provided on the supporting member 60 is inserted into a guide hole 26 (see FIG. 1). The coil spring 61 is held in a state of being elastically deformed in a compression direction of the z-direction, between an unillustrated spring receiving portion provided on the holding member 20 and the supporting member 60. The temperature sensor 10 can maintain a state where a heat collection member 30 is in contact with and pressed against the temperature measurement object 7, by elastic force F0 of the coil spring 61, irrespective of presence/absence of creep deformation of the heat collection member 30.

Note that the temperature sensor 10 can be installed by an appropriate method as long as the temperature sensor 10 can be installed in the state of being in contact with the temperature measurement object 7. For example, in place of the coil spring 61, a plate spring 62 as illustrated in FIG. 2B can be used. Alternatively, although illustration is omitted, a male screw is inserted into a hole provided in the supporting member 60, and the male screw engages with a female screw provided in the holding member 20, which makes it possible to install the temperature sensor 10 on the supporting member 60 in the state where the temperature sensor 10 is in contact with the temperature measurement object 7.

[Configuration of Temperature Sensor]

The configuration of the temperature sensor 10 is described with reference to FIG. 3 to FIG. 10.

Figure 3:
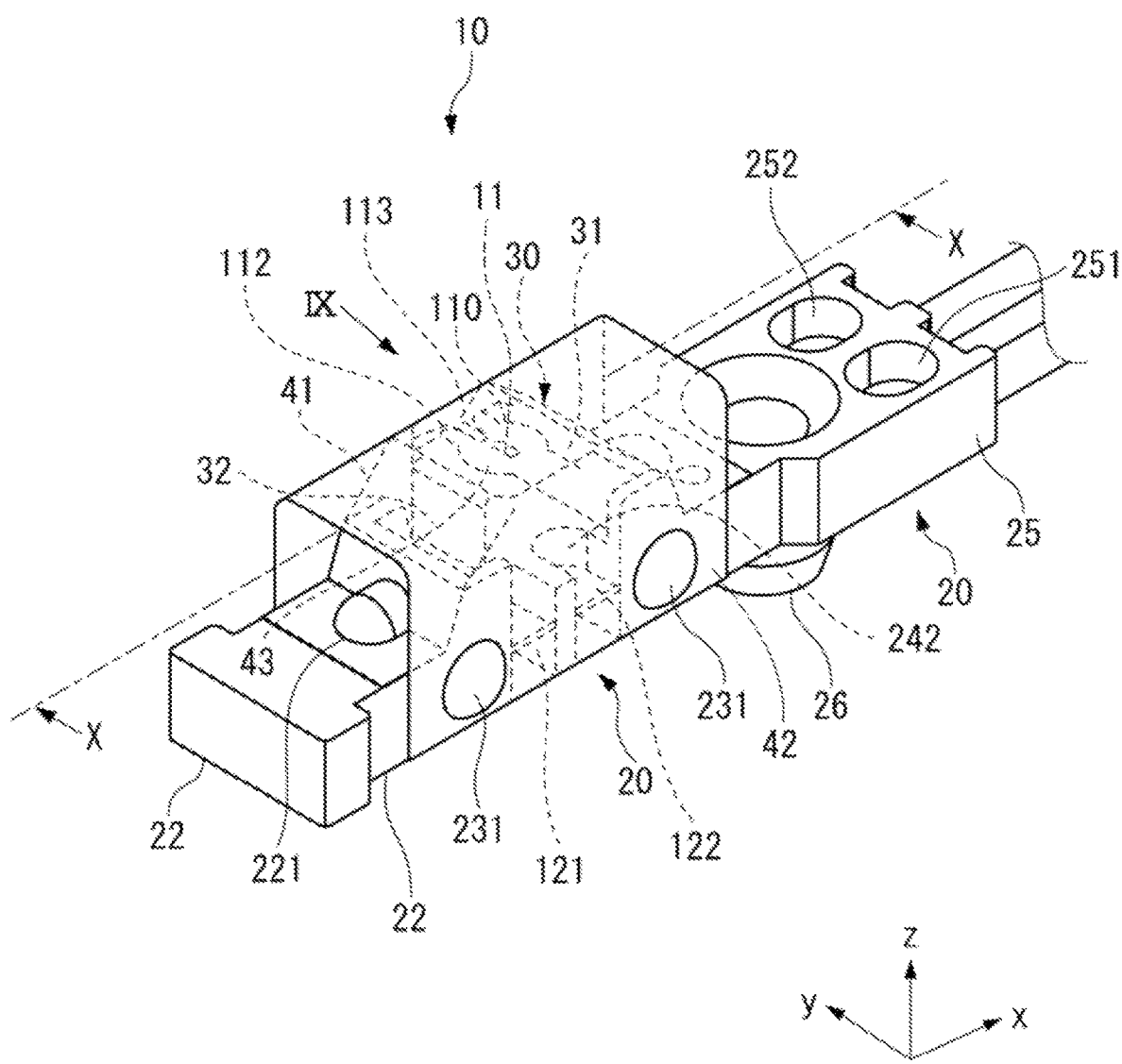
FIG. 3 is a perspective view illustrating the temperature sensor provided in the temperature detection device illustrated in FIG. 1.

As illustrated in FIG. 3, the temperature sensor 10 includes, as main components, a thermosensitive element 11 detecting the temperature of the temperature measurement object 7, the holding member 20, the heat collection member 30, an inner film 41 covering the heat collection member 30, and an outer film 42 covering the thermosensitive element 11 disposed on the inner film 41. The temperature sensor 10 further includes a heat collection material 43 filled around the thermosensitive element 11 between the inner film 41 and the outer film 42.

The components of the temperature sensor 10 are described below.

[Thermosensitive Element]

The thermosensitive element 11 is described with reference to FIG. 4. The thermosensitive element 11 is a thermistor element that includes a thermosensitive body 111, electrodes 111A and 111B provided on the thermosensitive body 111, paired lead wires 112 and 113 electrically connected to the electrodes 111A and 111B, and a sealing material 114 sealing the thermosensitive body 111. As the thermosensitive element 11, a resistor having a temperature coefficient, for example, a thin-film thermistor or a platinum temperature sensor is widely usable. The sealing material 114 may not be necessarily provided in the thermosensitive element 11. In the following, out of the thermosensitive body 111 and the sealing material 114, at least the thermosensitive body 111 is referred to as a thermosensitive portion 110.

For example, each of the lead wires 112 and 113 at least partially includes a clad wire drawn out from the sealing material 114. As the clad wire, for example, a Dumet wire is used.

The lead wires 112 and 113 are conducted to the electric wires 81 and 82 through paired conductive members 121 and 122 described below provided in the holding member 20, respectively.

[Holding Member]

The holding member 20 is described with reference to FIGS. 5A and 5B.

The holding member 20 according to the present embodiment is formed in a substantially rectangular shape in a planar view, and includes a main body portion 22 and an electric wire connection portion 25 to which the electric wires 81 and 82 are connected.

The main body portion 22 includes a base portion 202 and a housing portion 201. The base portion 202 and the electric wire connection portion 25 are integrally formed so as to be arranged in this order from a front side (F) toward a rear side (R) in the x-direction. The housing portion 201 includes a wall body 21 protruding in the z-direction from the base portion 202, and a substantially rectangular parallelepiped space 20S is provided inside the housing portion 201. The heat collection member 30 described below is disposed in the space 20S.

The holding member 20 is integrally formed by injection molding using an insulation resin material. An upper surface 22a of the base portion 202, a bottom part 215 of the housing portion 201, and an upper surface 25a of the electric wire connection portion 25 are provided at the same height in the z-direction. Further, a first boss 221 protruding in the z-direction is provided on each of the upper surface 22a of the base portion 202 and the upper surface 25a of the electric wire connection portion 25. Two second bosses 231 protruding in the y-direction are provided on each of side surfaces 23 of the main body portion 22. The first bosses 221 and the second bosses 231 are used to fix the inner film 41 and the outer film 42 to the holding member 20.

Note that, in the present embodiment, the case where the holding member 20 is formed in a rectangular shape in a planar view is described as an example; however, the present invention is not limited thereto. The holding member 20 may be formed in a square shape or a circular shape in a planar view, depending on the shape of the space 20S, arrangement of the first bosses 221 and the second bosses 231, and the like.

The electric wire connection portion 25 is a portion to which the electric wires 81 and 82 electrically connecting the thermosensitive element 11 and the circuit unit 8 are attached. The electric wire connection portion 25 includes connection holes 251 and 252 to connect the electric wires 81 and 82 to the conductive members 121 and 122 described below, respectively.

The housing portion 201 is provided to house the heat collection member 30, and is formed in a rectangular shape and in a concave shape in a planar view. The housing portion 201 includes the wall body 21 and the bottom part 215.

The wall body 21 includes a right wall 211 and a left wall 212 that extend in the x-direction and face each other in the y-direction, and a front wall 213 and a rear wall 214 that connect both ends of the right wall 211 and the left wall 212 in the x-direction. These walls 211 to 214 all erect from the bottom part 215 extending in the x-direction and the y-direction, toward the z-direction. Upper ends of the walls 211 to 214 form a rectangular opening. Inner surfaces 21A of the walls 211 to 214 and the side surfaces 23 all perpendicularly erect upward from the bottom part 215. Further, a corner 216 is formed by the front wall 213 and the bottom part 215, and a corner 217 is formed by the rear wall 214 and the bottom part 215. Outer surfaces 213A and 214A of the front wall 213 and the rear wall 214 are inclined in a direction approaching each other as going upward. Accordingly, the holding member 20 is formed in a frustum shape in a side view.

An electric wire installation portion 211A that is lowered by one step in the z-direction is provided at a center in the x-direction of the right wall 211. Paired grooves 211B extending in the z-direction are provided on an outer surface 211C of the electric wire installation portion 211A. The paired grooves 211B appear as projections inside the housing portion 201. The lead wires 112 and 113 of the thermosensitive element 11 are disposed in the paired grooves 211B.

Substantially arc-shaped notches 241 and 242 to respectively expose the conductive members 121 and 122 are provided in the left wall 212 and the bottom part 215.

The conductive members 121 and 122 can be insert-molded by being disposed in a mold for injection molding of the holding member 20. The lead wires 112 and 113 (FIG. 4) of the thermosensitive element 11 extend toward the right wall 211 side of the heat collection member 30, are bent downward in the z-direction, are bent toward a rear surface side of the holding member 20 through the electric wire installation portion 211A on one of the side surfaces 23 of the holding member 20, and are joined with the conductive members 121 and 122.

The space 20S is to prevent heat radiated from the temperature measurement object 7 from escaping to outside through the heat collection member 30, and maintains the heat in the thermosensitive element 11 by heat insulation action of air. This rapidly varies a resistance value of the thermosensitive element 11 relative to temperature variation of the temperature measurement object 7, and improves responsiveness of the temperature sensor 10. The space 20S has a cross-sectional area (area in x and y-directions) and a thickness (dimension in z-direction) realizing necessary thermal resistance.

To make a thermal conductivity of the space 20S as low as possible, it is desirable to dispose no substance other than the air in the space 20S as much as possible. Note that presence of a substance such as gas and liquid other than the air in the space 20S is not completely eliminated, and enclosure of a substance other than the air is not interfered as long as the low thermal conductivity can be maintained. Further, to prevent occurrence of convection in the space 20S, installation of a plate member or the like in the space 20S is allowed. Note that the space 20S may be formed in a shape other than the rectangular parallelepiped shape, for example, a cylindrical shape.

Contact protrusions 218 coming into contact with the heat collection member 30 are provided at four corners inside the wall body 21. The heat collection member 30 is positioned in the x-direction and the y-direction on the bottom part 215 by the two contact protrusions 218 provided on each of the right wall 211 and the left wall 212, the front wall 213, and the rear wall 214.

The contact protrusions 218 provided on the right wall 211 protrude toward the left wall 212, and the contact protrusions 218 provided on the left wall 212 protrude toward the right wall 211. Each of the contact protrusions 218 has an inclined shape gradually protruding in the y-direction from an upper end toward a lower end. The heat collection member 30 can be disposed on the bottom part 215 by being guided by the contact protrusions 218.

The first bosses 221 each have a truncated conical shape and are formed on the upper surface 22a of the main body portion 22 and the upper surface 25a of the electric wire connection portion 25, of the holding member 20.

The first bosses 221 are to attach the inner film 41 to the holding member 20, and are disposed one by one with the wall body 21 in between in the x-direction. The second bosses 231 are to attach the outer film 42 to the holding member 20. The two second bosses 231 are disposed on each of the side surfaces 23 of the holding member 20. This is illustrative, and the first bosses 221 and the second bosses 231 can be provided at appropriate positions of the holding member 20.

[Heat Collection Member]

The heat collection member 30 is described with reference to FIGS. 6A to 6C. The heat collection member 30 collects the heat radiated from the temperature measurement object 7 to the thermosensitive element 11, and is thermally joined with the thermosensitive element 11.

To rapidly transfer the heat from the temperature measurement object 7 to the thermosensitive element 11, a metal material higher in thermal conductivity than a resin material and the like, or other material having a thermal conductivity equivalent to the thermal conductivity of the metal material, for example, a metal material such as a copper alloy and stainless steel, or a material containing carbon is used for the heat collection member 30. For example, in a case where a plate member made of a metal material is used, the heat collection member 30 can be integrally formed by stamping and bending press working. The material used for the heat collection member 30 can be appropriately selected in consideration of the thermal conductivity, an elastic modulus, and heat resistance.

A thickness of the heat collection member 30 is, for example, about 0.03 mm to about 0.2 mm. The heat collection member 30 has a constant thickness; however, the thickness is not limited thereto.

When the heat collection member 30 is made of a metal material or the like having a high thermal conductivity, the resistance value of the thermosensitive element 11 can be immediately varied relative to the temperature variation of the temperature measurement object 7, and responsiveness can be further improved by heat collection action of the heat collection member 30 in addition to the heat insulation action of the space 20S. The term "heat collection" used herein means that the heat is received from the temperature measurement object 7 and is rapidly transferred to the thermosensitive element 11. The heat is maintained in the thermosensitive element 11 by the heat collection action of the heat collection member 30.

Figure 6A:
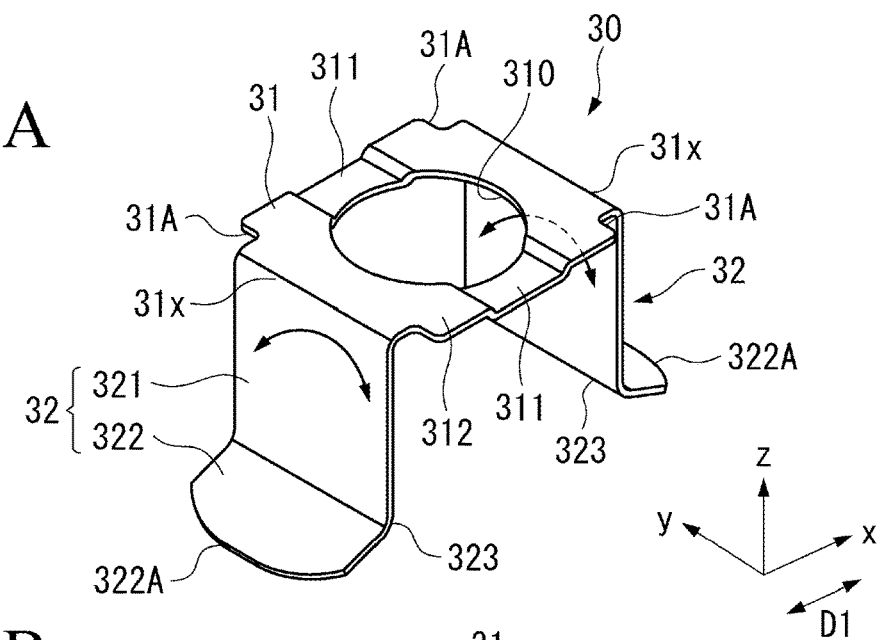
FIG. 6A is a perspective view of a heat collection member.

As illustrated in FIG. 6A, the heat collection member 30 includes an abutting portion 31 abutting along the temperature measurement object 7, and paired leg portions 32. The abutting portion 31 and the paired leg portions 32 are formed in a substantially U-shape as a whole by bending both ends in a longitudinal direction of a substantially rectangular metal plate. Note that a thickness of the abutting portion 31 and a thickness of each of the leg portions 32 may be equal to or different from each other.

Figure 6B:
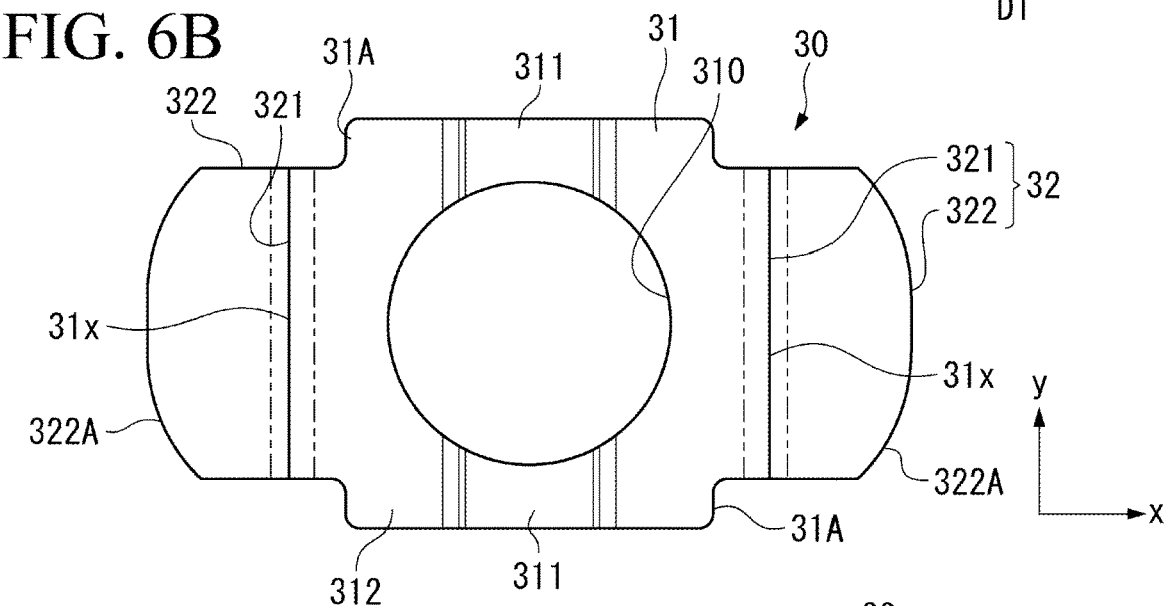
FIG. 6B is a plan view of the heat collection member.

As illustrated in FIG. 6B, the abutting portion 31 is formed in a square shape in a planar view of the temperature sensor 10. The abutting portion 31 includes a through hole 310 in which the thermosensitive portion 110 is disposed, paired grooves 311 where the lead wires 112 and 113 are disposed, and a plate-like flat portion 312 that comes into surface contact with the temperature measurement object 7 through the inner film 41 and the outer film 42. The through hole 310 and the grooves 311 configure an element arrangement portion where the thermosensitive element 11 is disposed.

The through hole 310 is a region where the thermosensitive portion 110 and a part of the lead wires 112 and 113 of the thermosensitive element 11 are disposed, and penetrates through the abutting portion 31 in the z-direction. The through hole 310 is formed in a circular shape at a center of the abutting portion 31, and a diameter thereof can be set to a diameter sufficient to house the thermosensitive portion 110.

The shape of the abutting portion 31 is not particularly limited, and the abutting portion 31 may be formed in a rectangular shape or a circular shape.

The abutting portion 31 has an area necessary for heat collection. If a heat input area of the abutting portion 31 is reduced with downsizing of the temperature sensor 10 in a planar direction, a ratio of heat escaping to the leg portions 32 in the whole of the heat collection member 30 is increased. However, since the through hole 310 provided in the abutting portion 31 can reduce a heat capacity in the vicinity of the thermosensitive portion 110, an amount of heat escaping to the vicinity of the thermosensitive portion 110 is small. Accordingly, in the present embodiment, responsiveness of temperature detection can be enhanced as compared with a case where the through hole 310 is not provided.

The thermosensitive portion 110 is disposed at a center or a substantially center of the through hole 310. Since the through hole 310 is formed in a circular shape, heat distribution around the thermosensitive portion 110 becomes substantially uniform, and stable temperature detection by the thermosensitive portion 110 can be performed.

Note that the shape of the through hole 310 is not necessarily the circular shape, and the through hole 310 may be formed in, for example, a square shape, a rectangular shape, or a polygonal shape.

The abutting portion 31 includes the paired grooves 311 where the lead wires 112 and 113 are disposed. As illustrated in FIG. 6B, the paired grooves 311 are provided symmetrically about the center of the through hole 310 on both sides in the y-direction with the through hole 310 in between.

Figure 6C:
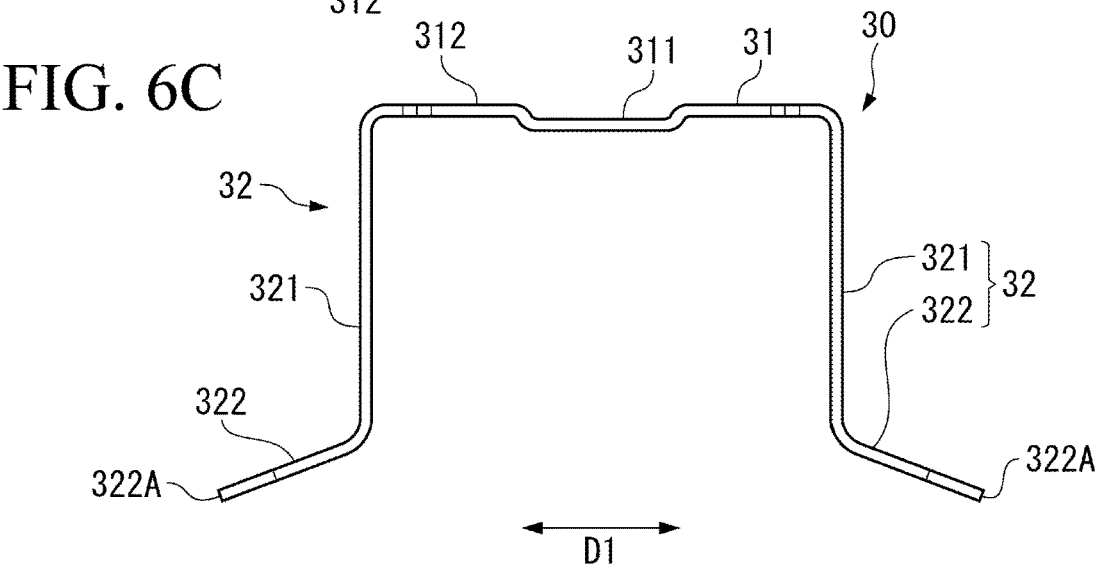
FIG. 6C is a side view of the heat collection member.

As illustrated in FIG. 6C, each of the grooves 311 is formed so as to be recessed downward in the z-direction from the flat portion 312 of the abutting portion 31. A width and a depth of each of the grooves 311 are set to a width and a depth sufficient to house the lead wires 112 and 113 inside each of the grooves 311. In the present embodiment, the temperature sensor 10 that includes the thermosensitive element 11 in which the lead wires 112 and 113 of the thermosensitive element 11 are drawn out to the same side from the sealing material 114 is used. Therefore, the lead wires 112 and 113 are disposed on one of the paired grooves 311. In this case, formation of the other groove 311 can be omitted.

The flat portion 312 is a portion excluding the through hole 310 and the grooves 311 of the abutting portion 31 and is formed flat. The flat portion 312 comes into surface contact with the temperature measurement object 7 through the inner film 41 and the outer film 42.

The paired leg portions 32 are provided on both sides in the x-direction of the abutting portion 31. As illustrated in FIGS. 6A and 6B, a width in the y-direction of each of the paired leg portions 32 is set slightly shorter than the width in the y-direction of the abutting portion 31, and notches 31A are symmetrically provided on both sides in the y-direction at both ends 31x in the x-direction of the abutting portion 31, at portions where the flat portion 312 of the abutting portion 31 and each of the leg portions 32 are connected to each other.

In the following, the x-direction in which the paired leg portions 32 are separated from each other is referred to as a "width direction D1" set to the heat collection member 30. In the width direction D1, a direction in which the paired leg portions 32 approach each other is referred to as "inside in width direction D1", and a direction in which the paired leg portions 32 are separated from each other is referred to as "outside in width direction D1".

As illustrated in FIG. 6C, each of the leg portions 32 includes a leg portion main body 321 extending perpendicularly to the abutting portion 31, and a tip end part 322 disposed on the bottom part 215. The paired leg portions 32 are formed in the same shape and to have the same dimensions, and are disposed symmetrically about the center in the width direction D1. An angle formed by each of the leg portions 32 to the abutting portion 31 is not necessarily strictly a right angle, and has a tolerance.

The leg portion main bodies 321 are formed by being bent perpendicularly to the abutting portion 31, and the tip end parts 322 are bent outward in the width direction D1 from the respective leg portion main bodies 321. The tip end parts 322 are formed by being bent from the respective leg portion main bodies 321 in a direction opposite to the direction in which the respective corresponding leg portion main bodies 321 are bent, and each form an obtuse angle to the corresponding leg portion main body 321 in a side view. Further, peripheral edges 322A of the tip end parts 322 each have an arc-shaped outer shape convex downward. A diameter of each of the peripheral edges 322A of the tip end parts 322 is set equal to a dimension in the y-direction of each of the leg portion main bodies 321.

Since the heat collection member 30 is simply formed in a substantially U-shape as described above, the heat collection member 30 can be easily press-molded at a low cost by moving a mold in a single direction (z-direction).

Each of the leg portions 32 has a length necessary to secure insulation between the temperature measurement object 7 and the conductive members 121 and 122. Therefore, even after creep deformation due to long use of the temperature sensor 10, a necessary space distance is secured between the temperature measurement object 7 and the conductive members 121 and 122.

The leg portion main bodies 321 are bent along the y-direction at positions of the notches 31A. Since the dimension in the y-direction of each of the leg portion main bodies 321 is set to a dimension substantially equivalent to the dimension in the y-direction of the abutting portion 31, rigidity in the z-direction of each of the leg portions 32 pressed between the temperature measurement object 7 and the holding member 20 by the coil spring 61 or the like is sufficiently secured.

Figure 11:
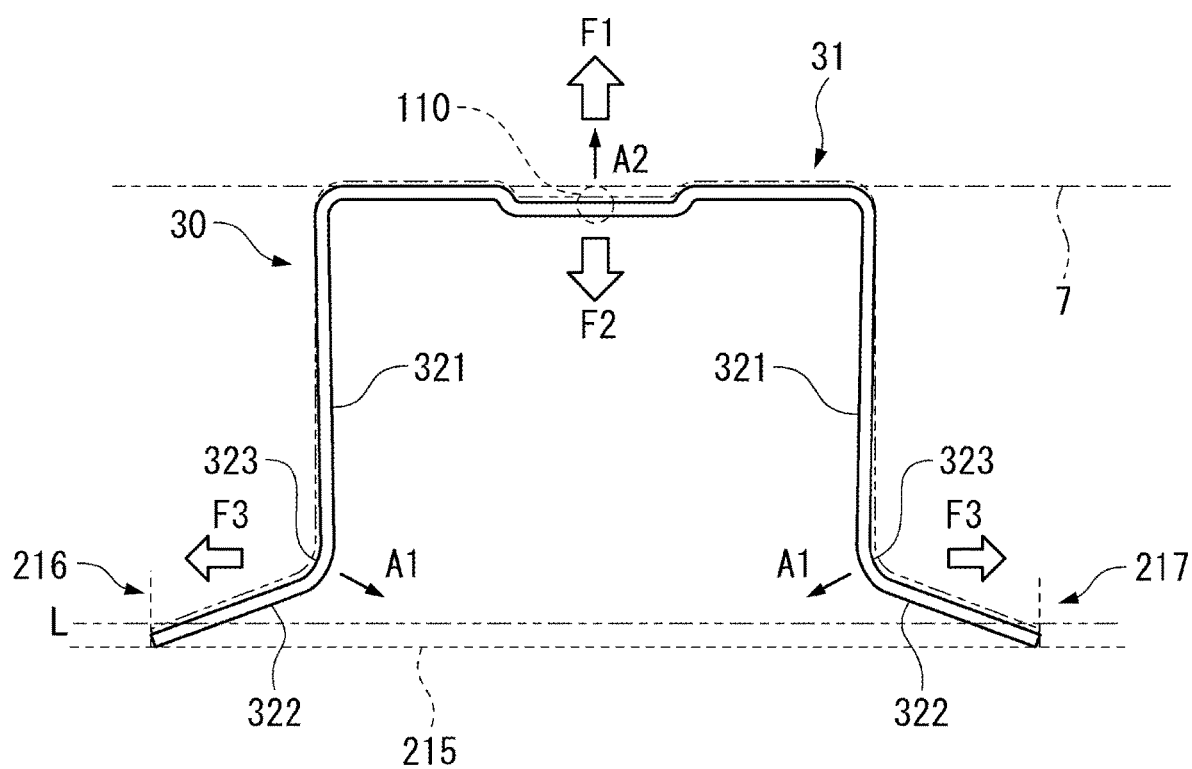
FIG. 11 is a schematic diagram to explain force acting on the heat collection member of the temperature sensor installed in a state of being in contact with the temperature measurement object.

As illustrated in FIG. 11, the leg portions 32 support the abutting portion 31 at a predetermined position against reaction force F2 to pressing force F1, and transmit the elastic force F0 of the coil spring 61 or the like to the abutting portion 31. Even when creep deformation occurs on the heat collection member 30, the abutting portion 31 is maintained in a state of abutting on the temperature measurement object 7 with necessary pressing force F1, by the elastic force F0 of the coil spring 61 or the like.

Since the leg portions 32 have sufficient rigidity in the z-direction as described above, deformation in a direction in which the abutting portion 31 is twisted relative to an x-y plane by the reaction force F2 is prevented.

The coil spring 61 or the like is disposed separately from the temperature measurement object 7 on a lower side 27 of the holding member 20, and the space 20S having the heat insulation action is present between the temperature measurement object 7 and the coil spring 61. Therefore, influence of the heat from the temperature measurement object 7 on the coil spring 61 is small. Accordingly, creep deformation does not occur on the coil spring 61, or even if the creep deformation occurs on the coil spring 61, a deformation amount by the creep deformation is negligibly small.

Figure 7A:
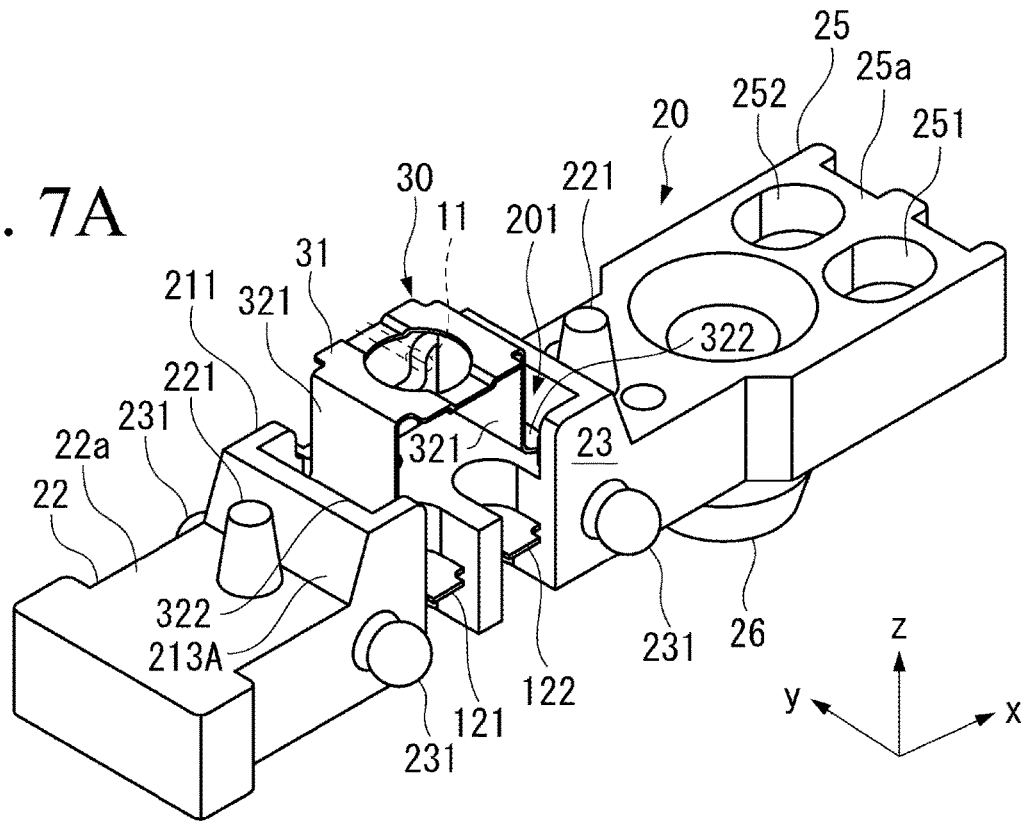
FIG. 7A is a perspective view illustrating a state where the heat collection member is assembled to the holding member.
Figure 7B:
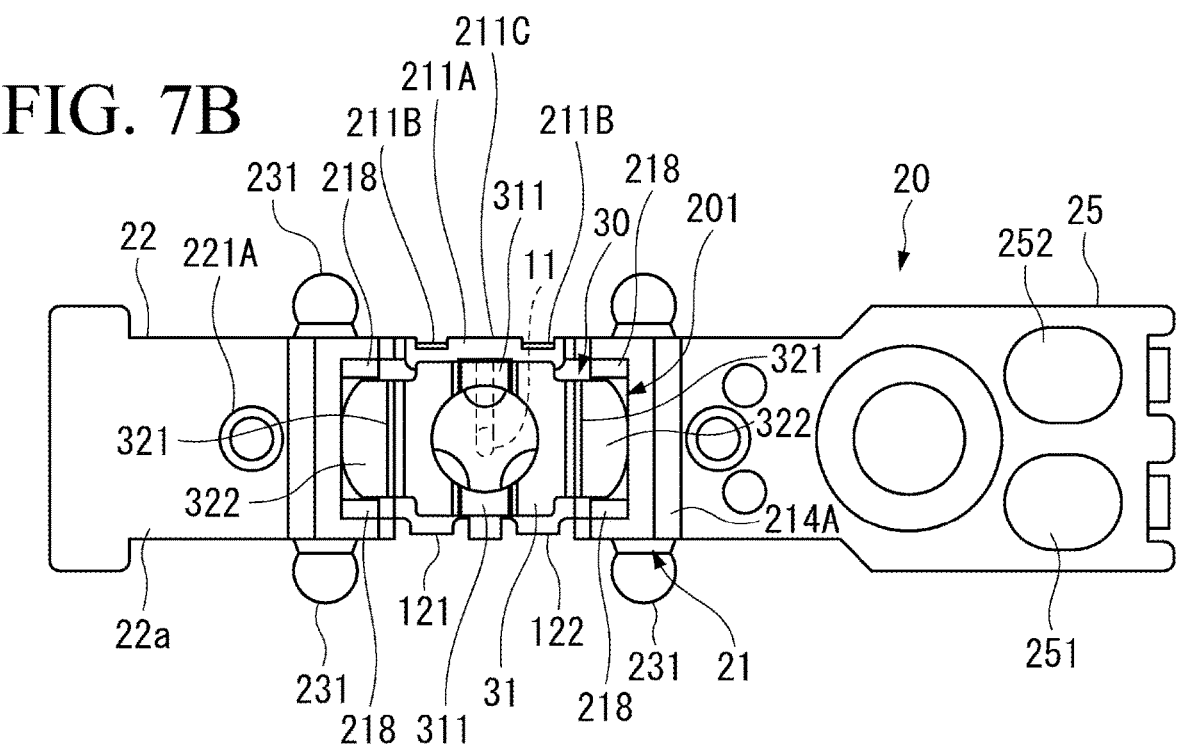
FIG. 7B is a plan view illustrating the state where the heat collection member is assembled to the holding member.

In the heat collection member 30 having the above-described configuration, the length in the x-direction, namely, the length between the peripheral edges 322A of the paired leg portions 32 is set to a length equal to or slightly greater than the length in the x-direction of the space 20S of the holding member 20. As illustrated in FIG. 7A, the heat collection member 30 is inserted into the space 20S of the holding member 20 from the leg portions 32 while the paired leg portions 32 are deflected inward in the width direction D1 as necessary. As a result, the tip end part 322 of the leg portion 32 positioned on the front side is positioned at the corner 216 formed by the front wall 213 and the bottom part 215, and the tip end part 322 of the leg portion 32 positioned on the rear side is positioned at the corner 217 formed by the rear wall 214 and the bottom part 215. When external force is applied to the abutting portion 31 in a direction other than the direction perpendicular to the abutting portion 31 in this state, the heat collection member 30 swings in the y-direction with tops of the peripheral edges 322A of the leg portions 32 as fulcrums (see arrows in FIG. 6A). As described above, the heat collection member 30 is swingably held by the holding member 20, which enables the heat collection member 30 and the temperature measurement object 7 to come into surface contact with each other.

When the heat collection member 30 is housed in the space 20S, the abutting portion 31 and upper sides of the leg portion main bodies 321 protrude upward from an upper end of the wall body 21. The heat collection member 30 protrudes from the upper end of the wall body 21 over a region substantially ½ of the entire height. The height of the region protruding from the upper end of the wall body 21 is varied based on the space distance necessary between the temperature measurement object 7 and the conductive members 121 and 122.

In a ratio of each of the leg portions 32 in the height in the z-direction, the height of the tip end part 322 is less than the height of the leg portion main body 321. Further, in a ratio of each of the leg portions 32 in the width in the x-direction, the width of the tip end part 322 is less than the width of the leg portion main body 321.

[Inner Film]

The inner film 41 is described with reference to FIG. 8.

The inner film 41 is a film-like insulation member that holds the thermosensitive element 11 while electrically insulating the heat collection member 30 and the thermosensitive element 11, and is disposed so as to overlap with a surface of the abutting portion 31.

A resin material such as polyimide and a fluorine resin is used for the inner film 41. A thickness of the inner film 41 is, for example, about 10 μm to about 20 μm.

The inner film 41 is formed in a rectangular shape having a size sufficient to cover the entire surface of the abutting portion 31 in order to sufficiently secure a creepage distance between the temperature measurement object 7 and the thermosensitive element 11. More specifically, a length of a short side of the inner film 41 is set equivalent to or slightly wider than the dimension in the y-direction of the heat collection member 30, and a dimension in the x-direction is set to a length not causing excessive tensile force on the inner film 41 when the inner film 41 is attached to the holding member 20 and the heat collection member 30. Although not illustrated, holes into which the paired first bosses 221 of the holding member 20 are inserted are provided at both ends in the x-direction of the inner film 41.

The inner film 41 is fixed to the holding member 20 in such a manner that the tip ends of the paired first bosses 221 are protruded from the surface of the inner film 41 while positions of the unillustrated paired holes are aligned with the positions of the paired first bosses 221 and the inner film 41 is mountain-folded, and then the tops of the paired first bosses 221 are thermally caulked.

The thermosensitive portion 110 is disposed at a position corresponding to the through hole 310 of the heat collection member 30, on the upper surface side of the inner film 41. More specifically, as illustrated by a dashed line in FIG. 8, the thermosensitive portion 110 is disposed at a position corresponding to the center of the through hole 310 of the heat collection member 30. At this time, the thermosensitive element 11 is disposed such that the lead wires 112 and 113 are disposed in the paired grooves 211B provided on the outer surface 211C of the electric wire installation portion 211A of the holding member 20 illustrated in FIGS. 7A, 7B and the lead wires 112 and 113 extend in the y-direction on the surface of the inner film 41. Further, the lead wires 112 and 113 are bent at an end part of the inner film 41 so as to extend toward the holding member 20 (downward), and are disposed in the respective grooves 211B. As described above, when the thermosensitive element 11 is disposed on the inner film 41, the heat collection member 30 and the thermosensitive element 11 are thermally joined with each other through the inner film 41. At this time, a slight deflection may be formed in a region where the inner film 41 and the heat collection member 30 overlap with each other, and the thermosensitive portion 110 of the thermosensitive element 11 may be housed in the deflection.

[Heat Collection Material]

When the thermosensitive element 11 is disposed on the inner film 41, the insulation heat collection material 43 that is thermally joined with the thermosensitive element 11 is preferably filled around the thermosensitive portion 110 disposed in the through hole 310 in order to collect heat to the thermosensitive element 11.

For example, a material containing a dispersion medium such as a silicone resin having a high thermal conductivity among resin materials and an insulation dispersion medium such as ceramic powder is used for the heat collection material 43. Further, so-called heat conductive grease or silicone oil compound can be used for the heat collection material 43.

The heat collection material 43 is filled over the inner film 41.

[Outer Film]

The outer film 42 is described with reference to FIG. 3 and FIG. 10. The outer film 42 is provided to insulate the thermosensitive element 11 and the temperature measurement object 7 while protecting the thermosensitive element 11 to prevent direct contact and damage of the thermosensitive element 11 and the temperature measurement object 7 when the temperature sensor 10 according to the present invention abuts on the temperature measurement object 7. The outer film 42 covers the heat collection member 30 and the holding member 20 from the temperature measurement object 7 side, and holds the thermosensitive element 11 to the heat collection member 30. Further, the outer film 42 covers most of the holding member 20 including the both side surfaces 23 in addition to the whole of the heat collection member 30, in order to sufficiently secure the creepage distance between the temperature measurement object 7 and each of the thermosensitive element 11 and the conductive members 121 and 122.

A resin material such as polyimide and a fluorine resin is used for the outer film 42. The outer film 42 is formed in a rectangular shape, and a length in the y-direction thereof is set to a length not causing excessive tensile force on the outer film 42 when the outer film 42 is fixed to the holding member 20. This is not to inhibit, when the holding member 20 swings, the swing by the outer film 42. Further, unillustrated holes into which the respective second bosses 231 provided on the holding member 20 are inserted are provided at positions corresponding to the respective second bosses 231, on both ends in the y-direction of the outer film 42. Note that a length in the x-direction of the outer film 42 may be set to a length preventing direct contact of at least the thermosensitive element 11 and the temperature measurement object 7, but is preferably set to a length securing the sufficient creepage distance between the thermosensitive element 11 and the temperature measurement object 7. As illustrated in FIG. 10B, the outer film 42 may be configured by stacking two or more film materials, or may be configured by one film material. An entire thickness of the outer film 42 is, for example, about 10 μm to about 20 μm.

The outer film 42 is disposed to overlap with the region of the inner film 41 where at least the thermosensitive element 11 is disposed, and is disposed on the holding member 20 by causing the second bosses 231 to be inserted into the holes. Further, the outer film 42 is fixed to the holding member 20 by thermally caulking the tops of the second bosses 231 on one of the side surfaces 23 of the holding member 20 and the tops of the second bosses 231 on the other side surface 23. At this time, tensile force slightly occurs on the outer film 42 between the second bosses 231 on one of the side surfaces 23 and the second bosses 231 on the other side surface 23, and force in the z-direction toward the holding member 20 is applied from the outer film 42 to the thermosensitive element 11 and the inner film 41, in some cases. In such a case, the inner film 41 may be recessed downward relative to the through hole 310.

Figure 10A:
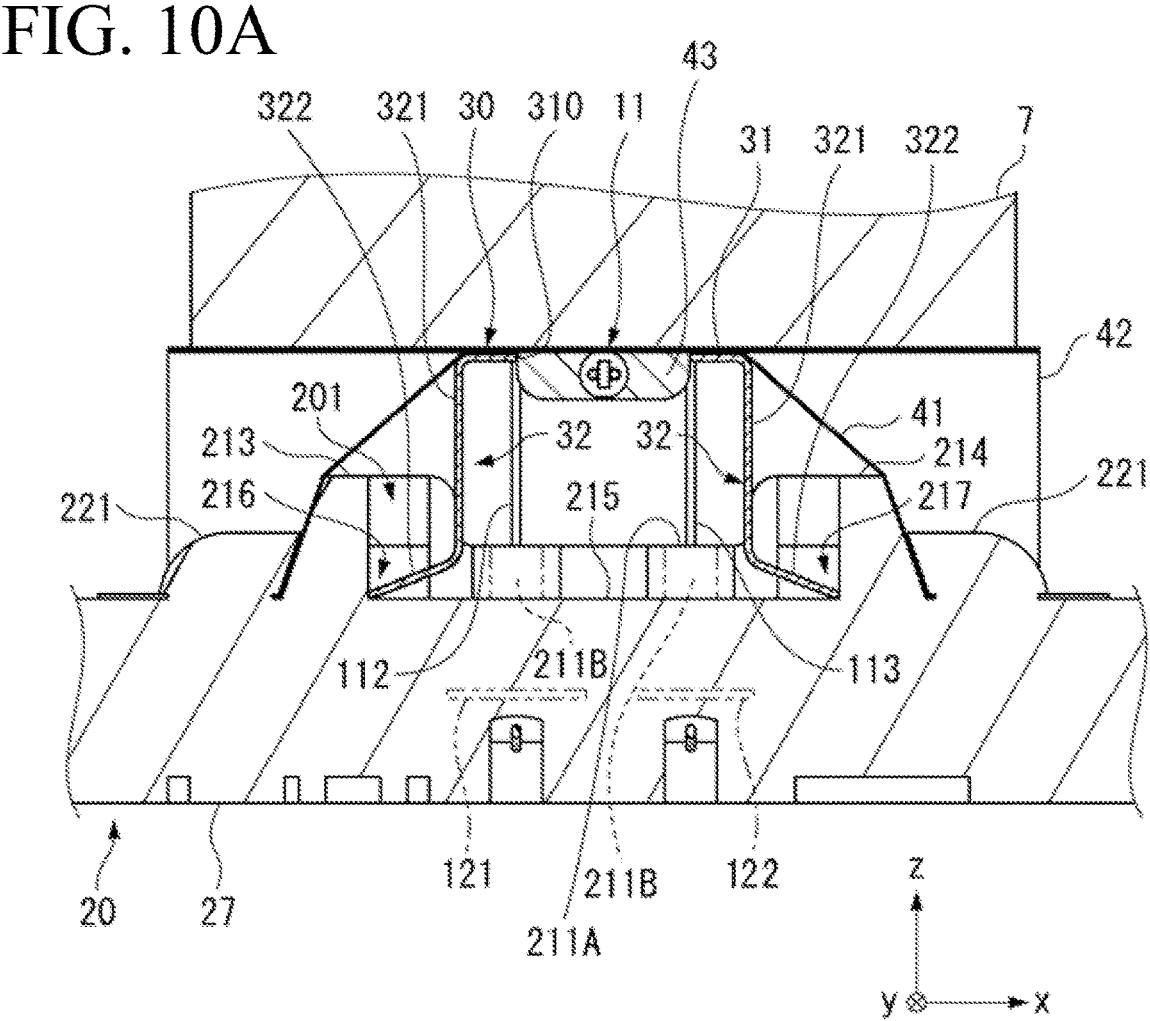
FIG. 10A is a cross-sectional view taken along line X-X in FIG. 3.
Figure 10B:
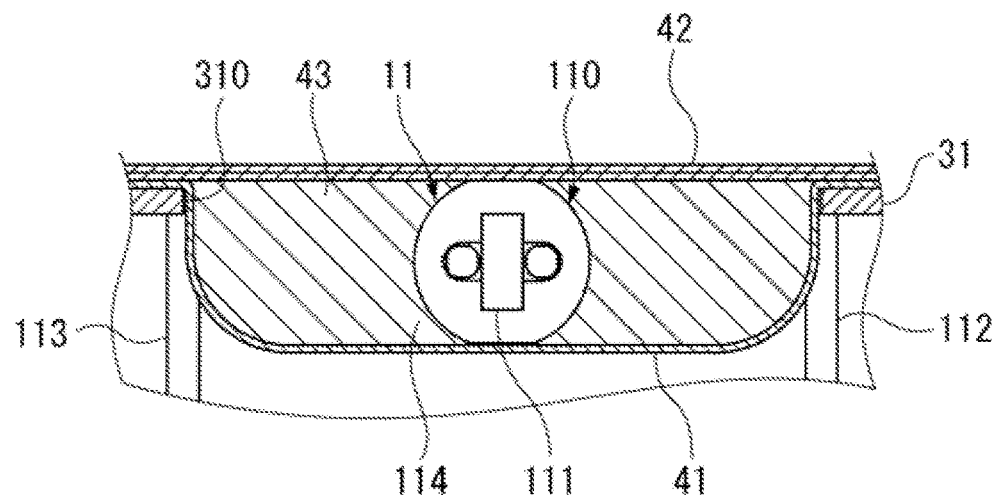
FIG. 10B is a partial enlarged view of FIG. 10A.

As illustrated in FIGS. 10A and 10B, when the abutting portion 31 is pressed against the temperature measurement object 7 through the outer film 42 by the coil spring 61, the thermosensitive portion 110 sinks to the inside of the through hole 310 while deforming the inner film 41, and abuts on the temperature measurement object 7 through the outer film 42. More specifically, when the abutting portion 31 is pressed against the temperature measurement object 7, the thermosensitive portion 110 sinks to be enclosed by the inner film 41, and the heat collection material 43 is accumulated inside a recessed dent of the inner film 41. At this time, an upper end of the thermosensitive portion 110 is located at a height position equivalent to the height position of the surface of the abutting portion 31, or is located lower than the position of the surface of the abutting portion 31. In other words, the thermosensitive portion 110 does not protrude upward from the surface of the abutting portion 31. Likewise, the lead wires 112 and 113 do not protrude upward from the surface of the abutting portion 31 because being housed in the grooves 311. This contributes to surface contact of the temperature measurement object 7 and the abutting portion 31.

The heat collection material 43 spreads around the thermosensitive portion 110, and is thermally joined with the thermosensitive portion 110 and the lead wires 112 and 113. The heat collection member 30 and the thermosensitive element 11 are sufficiently thermally joined with each other through the heat collection material 43 and the inner film 41.

[Behavior at Installation of Heat Collection Member 30, and State Change Depending on Heat/External Force Application Condition]

As described with reference to FIG. 2A, in the temperature sensor 10, when the heat collection member 30 is pressed against the temperature measurement object 7 by external force such as the elastic force F0 of the coil spring 61, the reaction force F2 to the pressing force F1 pressing the abutting portion 31 against the temperature measurement object 7 is applied to the abutting portion 31 as illustrated in FIG. 11.

The leg portions 32 of the heat collection member 30 are hardly elastically deformed by the reaction force F2, and the heat collection member 30 swings to bring the abutting portion 31 and the temperature measurement object 7 into surface contact with each other. At this time, in a case where the flat portion 312 of the abutting portion 31 and the temperature measurement object 7 do not squarely face each other, namely, in a case where the flat portion 312 is inclined to the temperature measurement object 7, an application point of the pressing force F1 and the reaction force F2 shifts rightward or leftward from the center in the y-direction of the abutting portion 31. Therefore, the heat collection member 30 swings with the peripheral edges 322A of the leg portions 32 as the fulcrums, and the flat portion 312 of the abutting portion 31 and the temperature measurement object 7 accordingly squarely face each other. In other words, the heat collection member 30 swings rightward or leftward in the y-direction based on a direction of the inclination of the abutting portion 31 to the temperature measurement object 7 (see arrows in FIG. 6A). As a result, the abutting portion 31 can follow and be brought into surface contact with the surface of the temperature measurement object 7 irrespective of dimensional tolerance and assembly tolerance of each of the heat collection member 30, the temperature measurement object 7, and the like. Further, no gap is generated between the temperature measurement object 7 and the abutting portion 31 because the heat collection member 30 swings. This makes it possible to sufficiently transfer the heat from the temperature measurement object 7 to the heat collection member 30.

The temperature sensor 10 according to the present invention is used in a state of being pressed against the temperature measurement object 7, and the heat is continuously transferred from the temperature measurement object 7 to the heat collection member 30. Therefore, creep deformation may occur on the heat collection member 30 with time. When the dimension in the z-direction of the heat collection member 30 is reduced due to occurrence of the creep deformation, the pressing force F1 is reduced as compared with an initial state, but the pressing force F1 greater than or equal to prescribed force sufficient to stably press the abutting portion 31 against the temperature measurement object 7 remains by the external force such as the elastic force of the coil spring 61.

The creep deformation is described with reference to FIG. 12A and FIG. 11. The bottom part 215 illustrated by a dashed line rises upward by the elastic force F0 of the coil spring 61 or the like by the dimension in the z-direction of the heat collection member 30 reduced by the creep deformation (see alternate long and two short dashes straight line L in FIG. 12A). Therefore, even when the leg portions 32 are contracted in the z-direction by the creep deformation, the abutting portion 31 is maintained, by the leg portions 32, in a state of being held at a predetermined position illustrated by an alternate long and short dash line (position of temperature measurement object 7).

FIGS. 12A to 12D schematically illustrate shape change of the heat collection member 30 by elastic deformation, based on an analysis result. As illustrated in FIG. 11 that is an extracted diagram of FIG. 12A, the temperature sensor 10 according to the present embodiment is pressed against the temperature measurement object 7 with the predetermined pressing force F1 by the elastic force F0 of the coil spring 61 or the like in the initial state. The pressing force F1 is appropriately set in consideration of rigidity of each of the heat collection member 30 and the temperature measurement object 7.

When the reaction force F2 acts on the abutting portion 31, the abutting portion 31 is hardly displaced in the z-direction because of rigidity of the leg portions 32. In addition, even when force F3 that separates the leg portions 32 from each other in the width direction D1 (x-direction) acts by the reaction force F2 of the abutting portion 31, the leg portions 32 do not move outward in the width direction D1 because outward movement in the width direction D1 of the leg portions 32 is restricted by the front wall 213 and the rear wall 214 of the holding member 20. Accordingly, in the heat collection member 30, the tip end parts 322 mainly deform in a compression direction of the z-direction.

As a result, also in a case where the creep deformation occurs, as illustrated by arrows A1 in FIG. 11, boundary portions 323 between the leg portion main bodies 321 and the respective tip end parts 322 displace in a direction approaching each other, and stress deforming the abutting portion 31 in a convex direction relative to the temperature measurement object 7 acts on the abutting portion 31 as illustrated in an arrow A2 in FIG. 11. This is true of a case where the leg portion main bodies 321 are deformed by the excessive pressing force F1 as illustrated in FIG. 12D.

As described above, the stress in the convex direction relative to the temperature measurement object 7 acts on the abutting portion 31. Therefore, the abutting portion 31 can tightly contact with the surface of the temperature measurement object 7 over a wide range including the position of the thermosensitive portion 110 and surroundings thereof.

Figure 13:
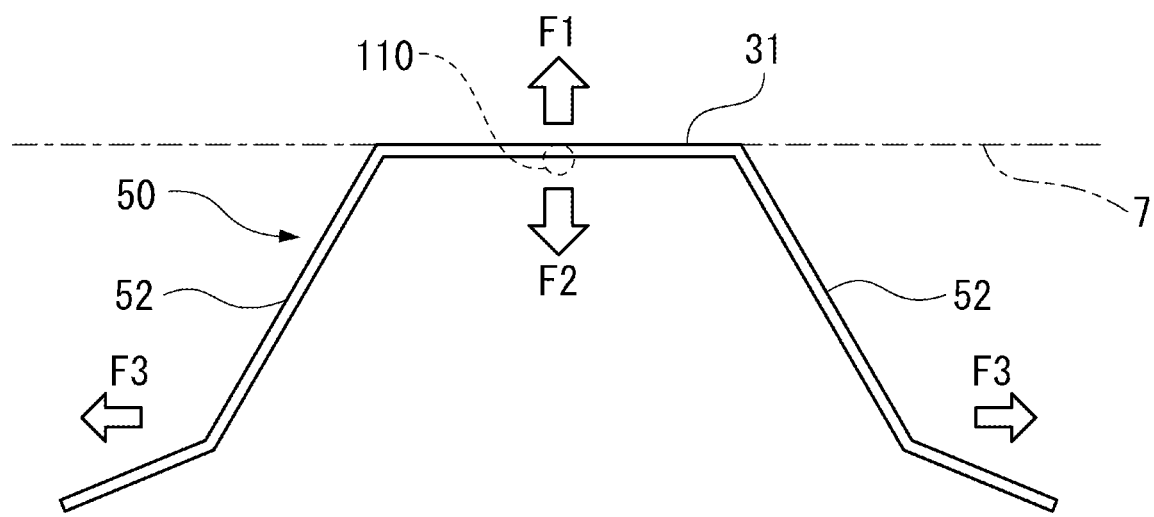
FIG. 13 is a schematic diagram illustrating a heat collection member according to a comparative example.

Unlike the present embodiment, it is assumed that, as with a heat collection member 50 according to a comparative example illustrated in FIG. 13, leg portions 52 are each formed in a shape opening outward relative to the abutting portion 31 in a no-load state, and outward movement of the leg portions 52 by force F3 separating the leg portions 52 from each other by the reaction force F2 is not restricted. In this case, the leg portions 52 further open outward by the force F3, and the heat collection member 50 deforms in an M-shape in a side view as a whole. As a result, the abutting portion 31 deforms in a concave direction relative to the temperature measurement object 7. Therefore, the abutting portion 31 is separated from the temperature measurement object 7 at and around the position of the thermosensitive portion 110, and a space distance between conductors in the temperature measurement object 7 and the temperature sensor 10 is reduced.

To sufficiently generate, in the abutting portion 31, stress in the convex direction relative to the temperature measurement object 7, the leg portions 32 are preferably bent inward in the width direction D1 from respective ends 31x of the abutting portion 31. In the present embodiment, the angle formed by each of the leg portions 32 to the abutting portion 31 is set to a right angle; however, the tolerance of each of the leg portions 32 is preferably set inward in the width direction D1 such that the leg portions 32 are processed in a state of being bent inward in the width direction D1 even by a minute amount.

[Procedure of Assembling Temperature Sensor]

For example, the temperature sensor 10 can be assembled by the following procedure.

The procedure is described.

Terminal ends of the lead wires 112 and 113 are electrically and mechanically connected to the conductive members 121 and 122 (FIG. 10A) insert-molded in the holding member 20, by welding or the like.

Figure 5A:
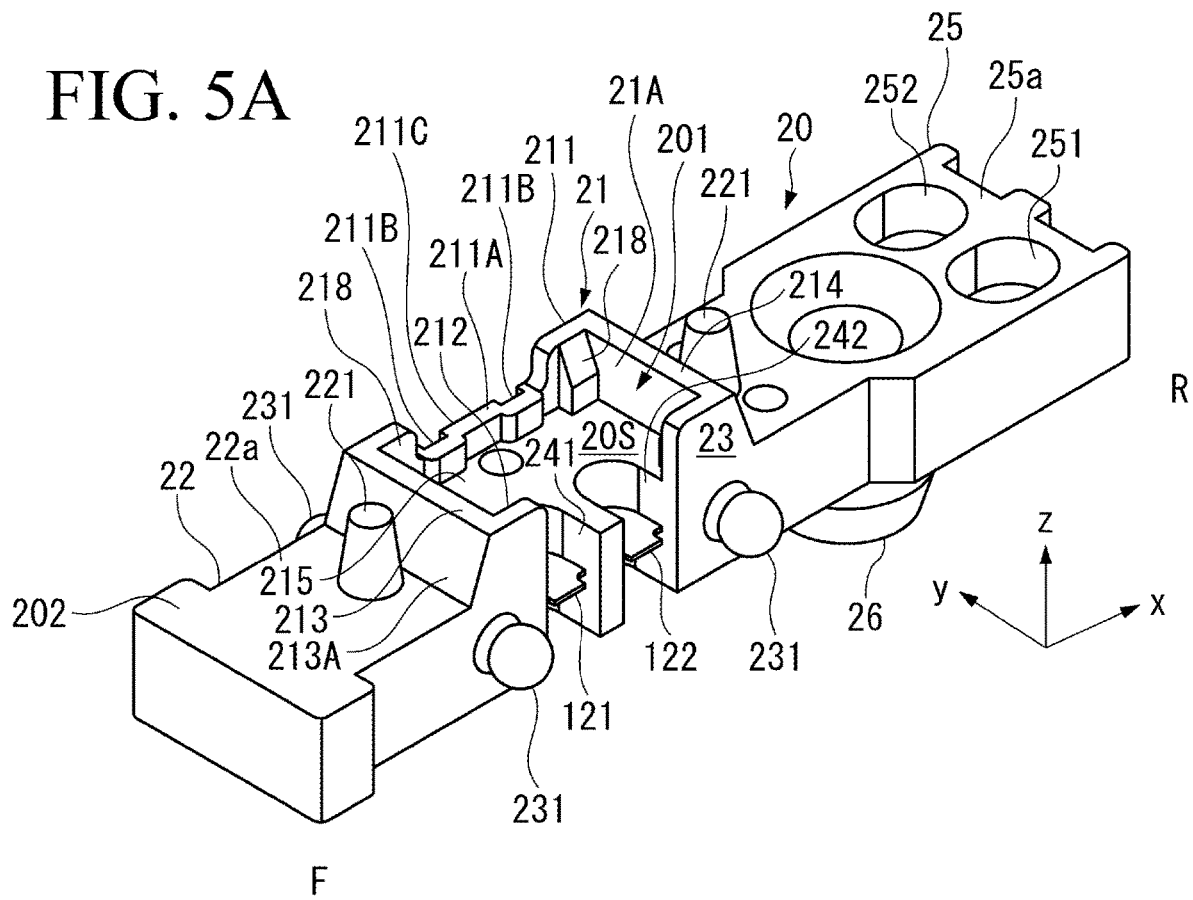
FIG. 5A is a perspective view of a holding member.
Figure 5B:
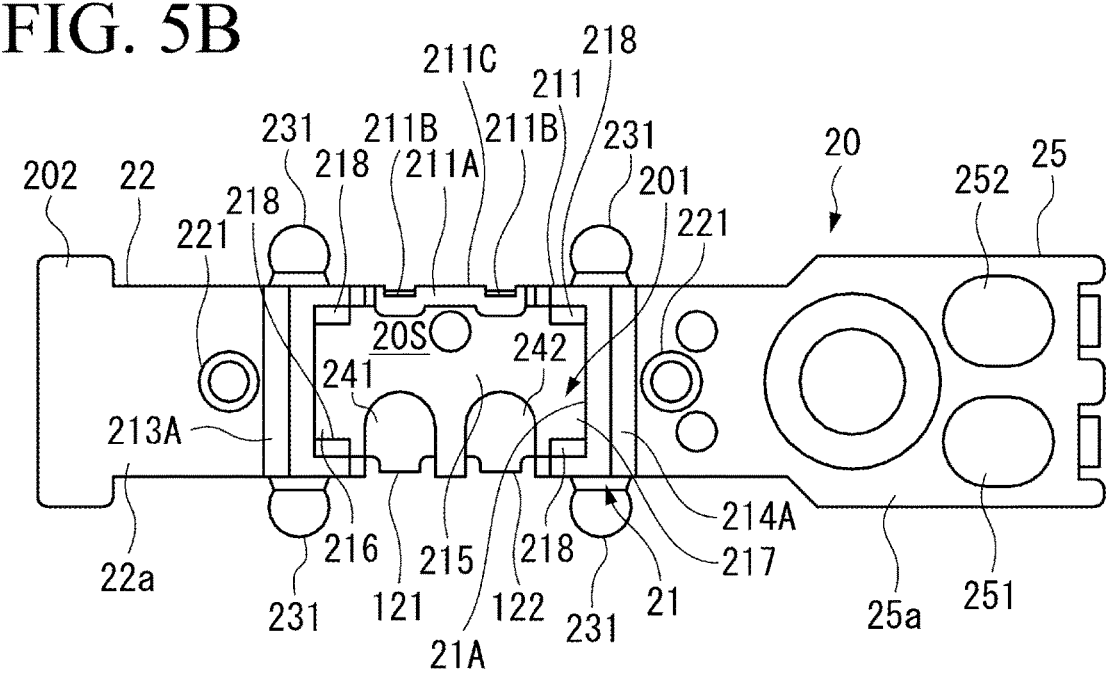
FIG. 5B is a plan view of the holding member.

(2) The leg portions 32 of the heat collection member 30 are inserted into the housing portion 201 of the holding member 20 illustrated in FIGS. 5A and 5B. The tip end parts 322 of the paired leg portions 32 are disposed at the corners 216 and 217 at the bottom part 215 of the housing portion 201. At this time, the abutting portion 31 is positioned above the upper end of the wall body 21.

Figure 8:
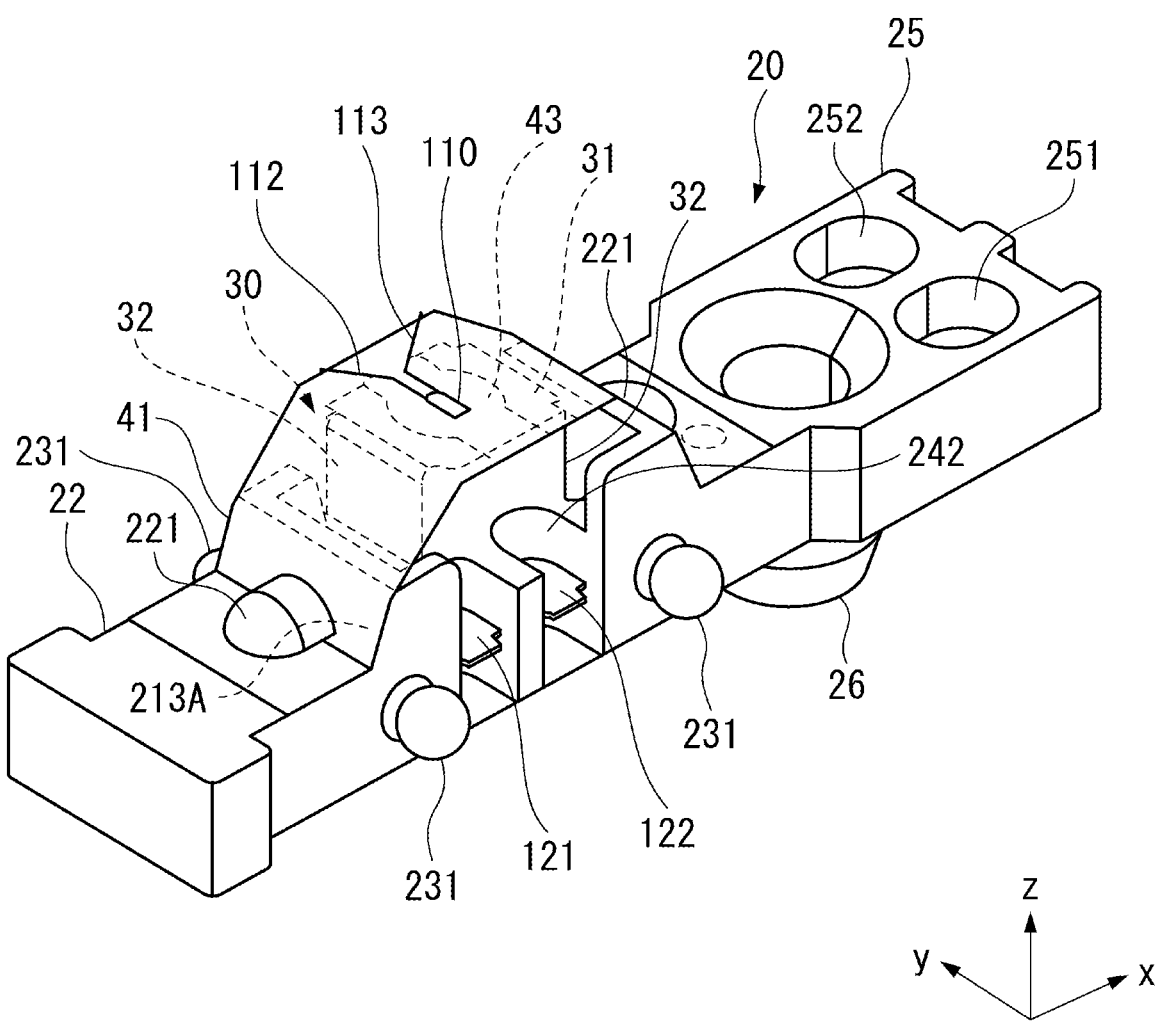
FIG. 8 is a perspective view illustrating a state where the thermosensitive element is disposed on the heat collection member illustrated in FIG. 7A through an inner film.
Figure 9:
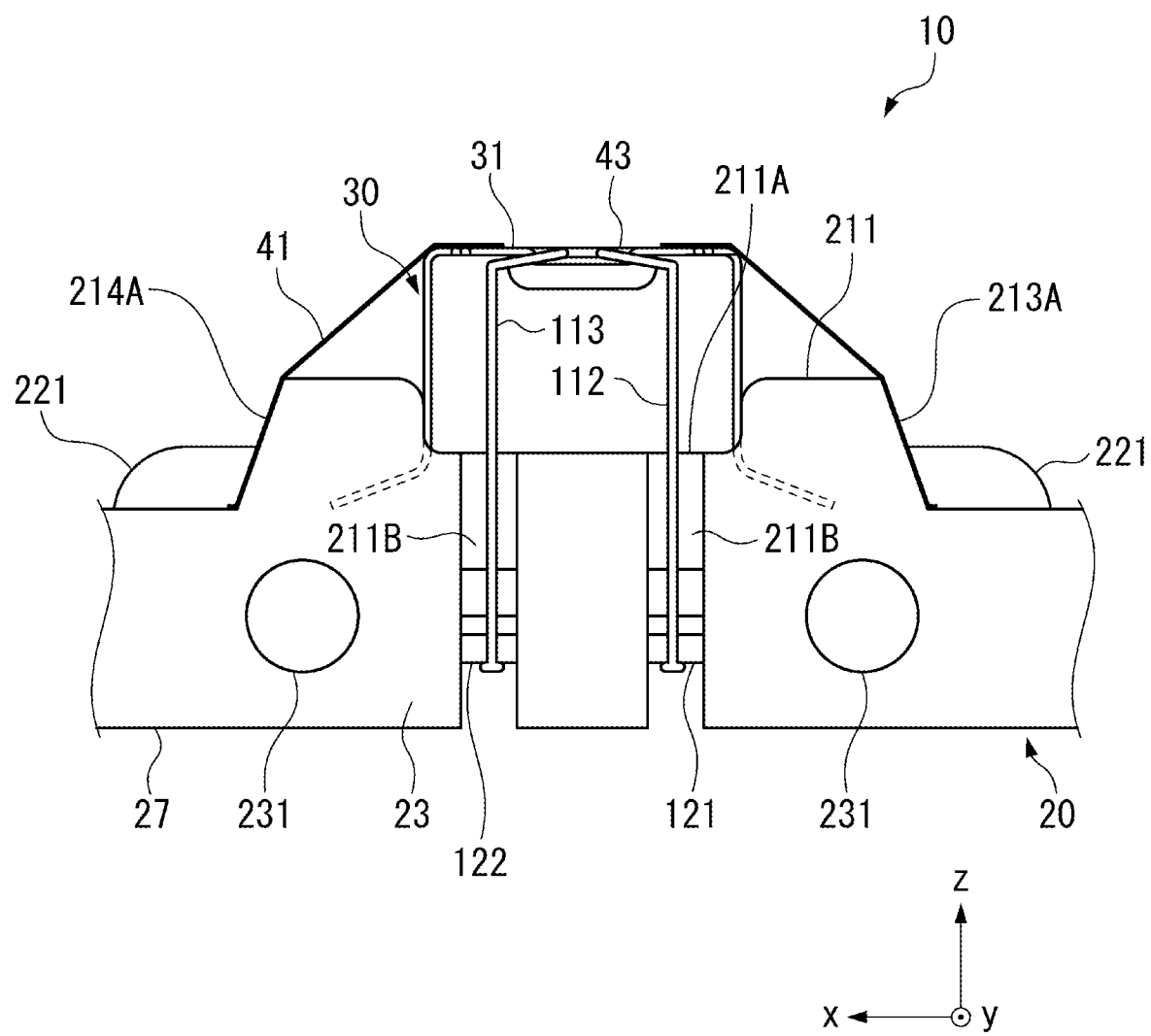
FIG. 9 is a side view of the temperature sensor as viewed from a direction of an arrow IX in FIG. 3, in which illustration of an outer film is omitted.

(3) As illustrated in FIG. 8, after the heat collection member 30 is covered with the inner film 41, and the first bosses 221 are inserted into the holes provided at both ends of the inner film 41, the inner film 41 is fixed to the holding member 20 by thermal caulking to apply heat and pressure to the first bosses 221.

(4) The lead wires 112 and 113 are laid while being shaped, and the thermosensitive element 11 is assembled to the holding member 20 and the heat collection member 30. More specifically, after the lead wires 112 and 113 are bent upward from the conductive members 121 and 122 along the electric wire installation portion 211A of the holding member 20, the lead wires 112 and 113 are also bent at the position of the abutting portion 31, thereby disposing the thermosensitive portion 110 in the through hole 310 of the abutting portion 31 on which the inner film 41 is placed.

(5) The heat collection material 43 is supplied to the thermosensitive portion 110 and the vicinity thereof.

(6) As illustrated in FIG. 1, the most part of the holding member 20 including the thermosensitive element 11 and the heat collection material 43 is covered with the outer film 42, and the outer film 42 is fixed to the holding member 20 by thermal caulking of the second bosses 231 in a manner similar to the first bosses 221.

The assembly of the temperature sensor 10 is completed through the steps (1) to (6).

With the temperature sensor 10 according to the present embodiment described above, it is possible to realize the small temperature sensor 10 that includes heat insulation property, durability under a use condition where the creep deformation occurs, following capability to the temperature measurement object 7, and responsiveness greater than or equivalent to a case where so-called ceramic paper is used, by the heat collection member 30 that is pressed against the temperature measurement object 7, the holding member 20 that receives the heat collection member 30 against the force F2 and F3, and the space 20S present on the rear surface side of the heat collection member 30.

[Other Embodiment of Heat Collection Member]

Figure 14A:
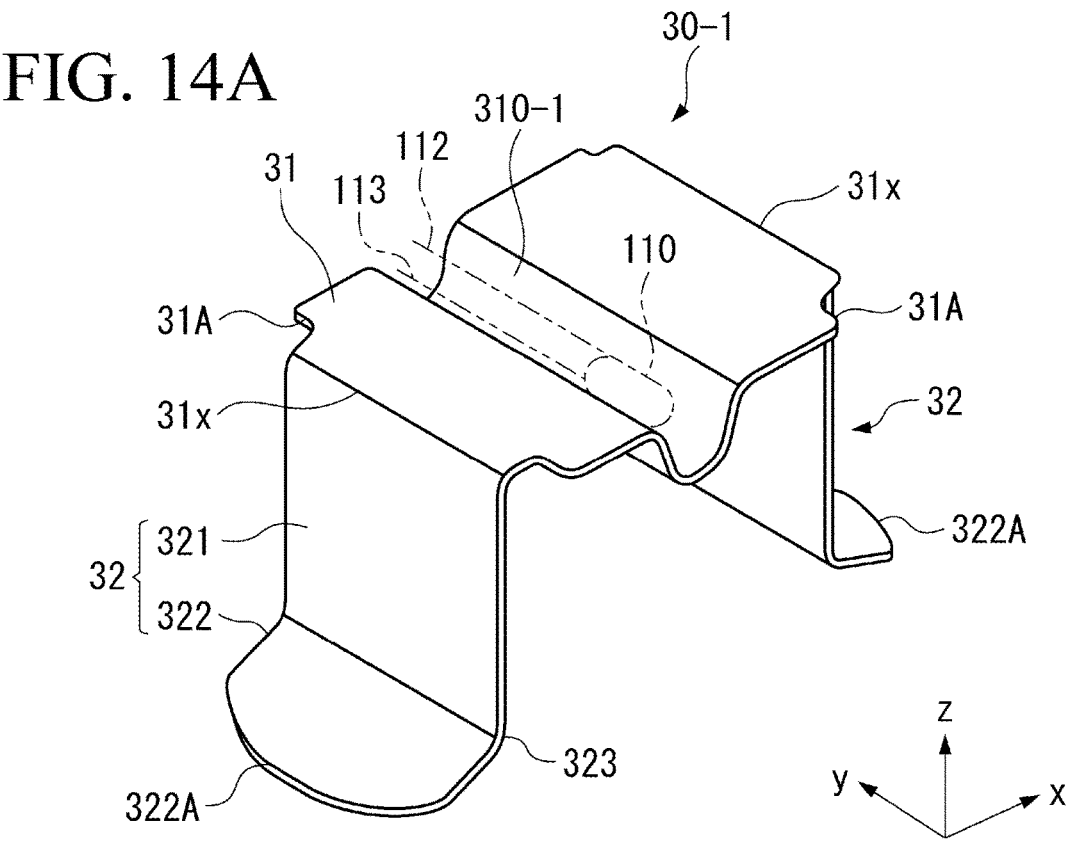
FIG. 14A is a perspective view illustrating a heat collection member according to a modification of the embodiment.
Figure 14B:
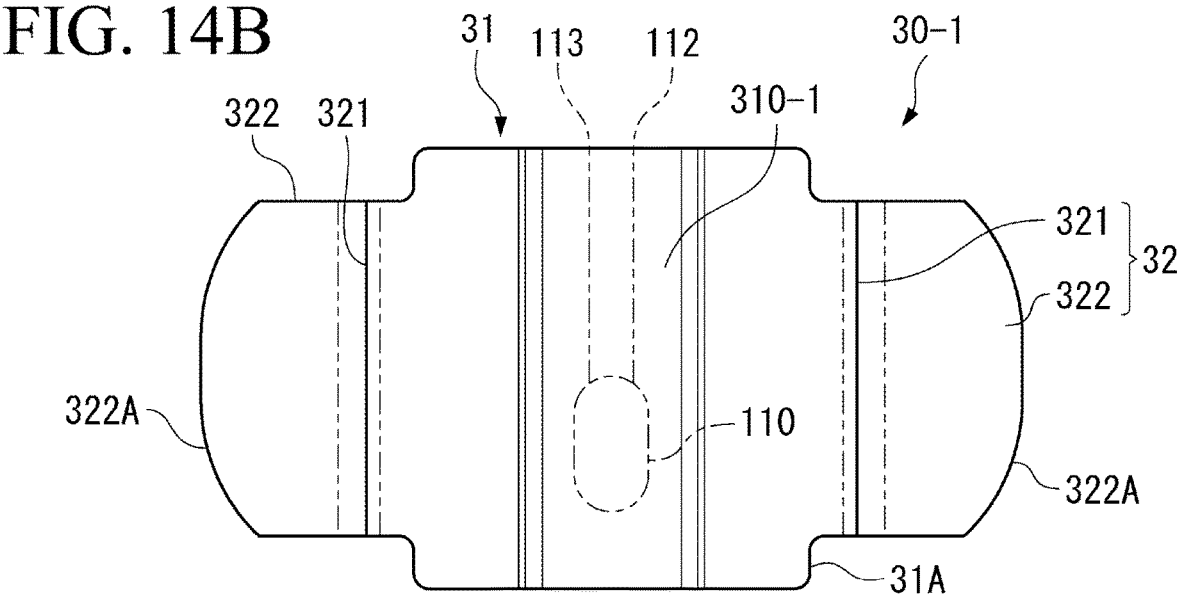
FIG. 14B is a plan view illustrating the heat collection member according to the modification of the embodiment.

FIGS. 14A and 14B each illustrate a heat collection member 30-1 that can be used as substitute for the heat collection member 30 according to the above-described embodiment. The abutting portion 31 of the heat collection member 30-1 includes, in place of the through hole 310, a groove 310-1 in which the thermosensitive portion 110 and a part of the lead wires 112 and 113 are disposed.

The groove 310-1 extends in the y-direction in the abutting portion 31, and is formed in a concave shape that is bent downward from the surface of the abutting portion 31. The groove 310-1 is formed from one end to the other end in the y-direction of the abutting portion 31.

The groove 310-1 has a width (dimension in x-direction) and a depth sufficient to house the thermosensitive portion 110.

As in the above-described embodiment, insulation between the thermosensitive element 11 disposed in the groove 310-1 and the heat collection member 30-1 is realized and the thermosensitive element 11 is held by the inner film 41 disposed on the surface of the abutting portion 31. The inside of the groove 310-1 is filled with the heat collection material 43 through the inner film 41.

When the heat collection member 30-1 including the groove 310-1 is adopted, the heat collection member 30-1 is disposed below the thermosensitive element 11. Therefore, the heat can be sufficiently kept in the thermosensitive element 11 positioned between the temperature measurement object 7 and the heat collection member 30-1, and the temperature of the thermosensitive element 11 can excellently follow the temperature variation of the temperature measurement object 7.

In a case where the lead wires 112 and 113 each include an insulation covering, the inner film 41 is not always necessary even when the heat collection member 30-1 has conductivity. Likewise, in a case where the heat collection member 30-1 is a member not having conductivity, for example, a resin molded product, the inner film 41 is unnecessary, and installation thereof can be omitted.

The width and the depth of the groove 310-1 may not be constant as long as heat collection property and heat insulation property can be secured. For example, the dimension of the groove 310-1 in the z-direction at the position where the thermosensitive element 11 is disposed may be greater than the dimension of the region where the lead wires 112 and 113 are disposed, or a through hole may be provided.

[Modification of Heat Collection Member]

A modification of the heat collection member is described below.

Figure 15A:
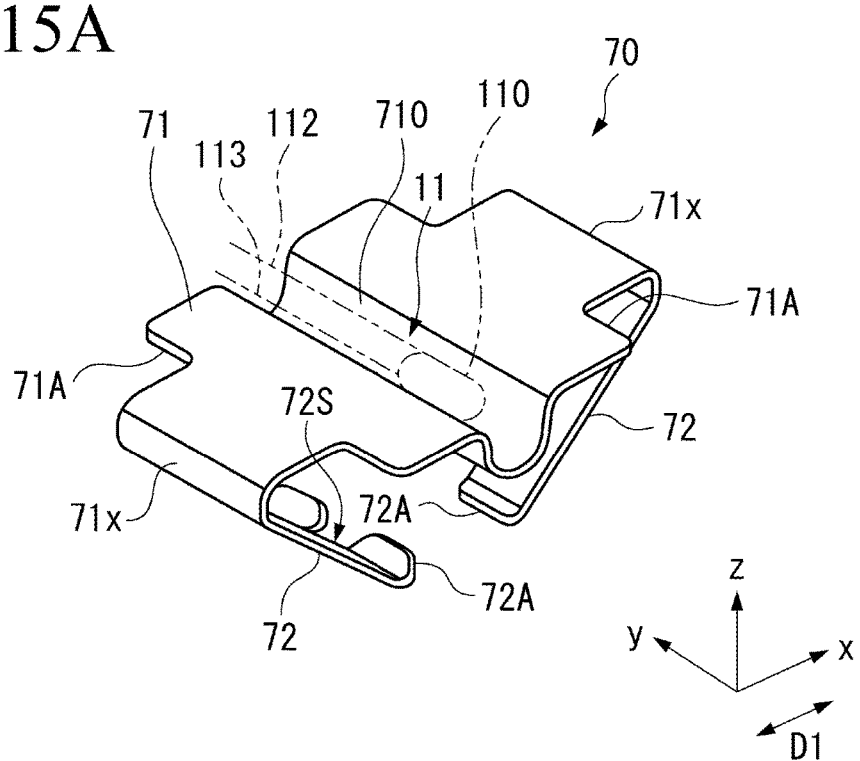
FIG. 15A is a perspective view illustrating a heat collection member provided in a temperature sensor according to a modification.
Figures 15B, 15C:
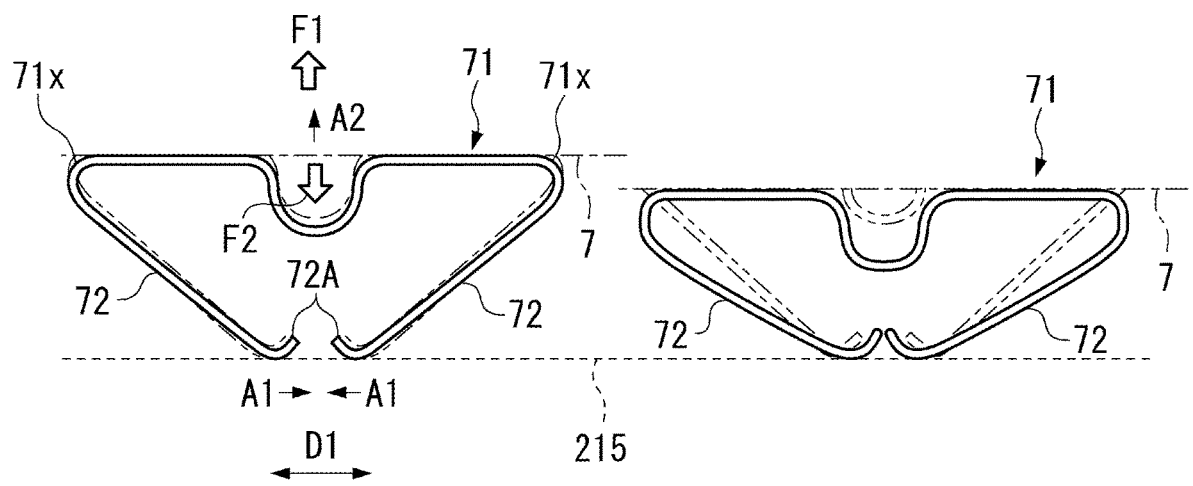
FIGS. 15B and 15C are diagrams illustrating a state where a shape of the heat collection member is deformed with increase in a deformation amount of the heat collection member.

FIGS. 15A to 15C each illustrate a heat collection member 70 provided in a temperature sensor according to a modification. The heat collection member 70 can be adopted in place of the heat collection member 30 in the temperature sensor 10 according to the above-described embodiment. Differences from the above-described embodiment are mainly described below.

The heat collection member 70 includes an abutting portion 71 similar to the abutting portion 31 of the heat collection member 30, and paired spring leg portions 72 that support the abutting portion 71 at positions separated in the width direction D1 and abut on the bottom part 215 of the holding member 20.

The temperature sensor including the thermosensitive element 11, the holding member 20, and the heat collection member 70 is placed on the temperature measurement object 7 in a state where the spring leg portions 72 are elastically deformed by a predetermined amount in a compression direction of the z-direction, when the holding member 20 is supported by an unillustrated supporting member. In this state, the spring leg portions 72 press the abutting portion 71 against the temperature measurement object 7 by its elastic force.

The heat collection member 70 is disposed in the housing portion 201 of the holding member 20, and protrudes upward from the upper end of the wall body 21 over a region substantially ½ of the entire height. The height of the protruding region of the heat collection member 70 is varied based on the space distance necessary between the temperature measurement object 7 and the conductive members 121 and 122 and the like.

As with the heat collection member 30, the heat collection member 70 can be integrally molded by using a material excellent in thermal conductivity, such as a metal material. The heat collection member 70 according to the present modification is integrally formed by, for example, performing stamping and bending press working on a metal plate having a thickness of about 0.03 mm to about 0.2 mm.

The spring leg portions 72 are bent inward in the width direction D1 from the abutting portion 71 on both sides in the width direction D1 of the abutting portion 71 provided with notches 71A. Each of the spring leg portions 72 forms a downward acute angle to the abutting portion 71 at each end 71x in the width direction D1 of the abutting portion 71, and straightly extends to the bottom part 215 in a no-load state. Only tip ends 72A of the spring leg portions 72 are bent upward from portions disposed on the bottom part 215, and are separated from the bottom part 215. In the no-load state, the tip ends 72A of the spring leg portions 72 are separated from each other by a predetermined dimension in the x-direction.

Each of the spring leg portions 72 is branched in a fork shape by a slit 72S extending upward from the tip end 72A except for a base end part.

When force pressing the abutting portion 71 against the temperature measurement object 7 by the elastic force of the spring leg portions 72 is referred to as pressing force F1, the tip ends 72A of the paired spring leg portions 72 displace in a direction approaching each other while sliding on the bottom part 215 by reaction force F2 applied to the abutting portion 71 as illustrated by arrows A1 in FIG. 15B, and stress deforming the abutting portion 71 in a convex direction relative to the temperature measurement object 7 acts on the abutting portion 71 as illustrated by an arrow A2. This is true of a case where an elastic deformation amount is increased as illustrated in FIG. 15C.

Since the spring leg portions 72 are disposed in a state of being inclined to the z-direction from positions above the upper end of the holding member 20 to the bottom part 215, the spring leg portions 72 each have a long spring length. Therefore, even in a case where the heat collection member 70 is downsized in a planar direction, each of the spring leg portions 72 realizes the elastic deformation amount necessary to enable the heat collection member 70 to have strength against a use condition of the temperature sensor. The elastic deformation amount in the z-direction of each of the spring leg portions 72 is sufficiently greater than the dimensional tolerance and the assembly tolerance of each of the temperature sensor 10 and the temperature measurement object 7, and a deformation amount caused by the creep deformation.

The elastic deformation of the heat collection member 70 enables a posture of the abutting portion 71 to follow the surface of the temperature measurement object 7 irrespective of the dimensional tolerance and the assembly tolerance. This makes it possible to bring the abutting portion 71 and the temperature measurement object 7 into close surface contact with each other. Since the tip end of each of the spring leg portions 72 is branched in a fork shape, the posture of the abutting portion 71 can follow the temperature measurement object 7 more.

Further, even when the creep deformation in the compression direction of the z-direction occurs on the heat collection member 70 due to long use, and the dimension in the z-direction between the temperature measurement object 7 and the bottom part 215 is increased with reduction in the dimension in the z-direction of the heat collection member 70, the pressing force F1 necessary to stably press the abutting portion 71 against the temperature measurement object 7 remains by the elastic force of the spring leg portions 72.

Since it is possible to press the abutting portion 71 against the temperature measurement object 7 with necessary pressure by the elastic force of the spring leg portions 72, it is unnecessary to press the abutting portion 71 by the elastic force of the coil spring 61, the plate spring 62, or the like, unlike the above-described embodiment (FIGS. 2A, 2B). Note that, in the modification, pressing of the heat collection member 70 against the temperature measurement object 7 by the elastic force of the coil spring 61 or the plate spring 62 through the holding member 20 is not interfered.

The temperature sensor according to the modification including the heat collection member 70 can also realize the small temperature sensor that includes heat insulation property, durability against the creep deformation, following capability to the temperature measurement object 7, and responsiveness greater than or equivalent to a so-called ceramic paper, as with the temperature sensor 10 according to the above-described embodiment.

Heat collection members each substitutable for the heat collection member 70 are described with reference to FIG. 16.

Each of paired spring leg portions 72-1 of a heat collection member 70-1 illustrated in FIGS. 16A to 16E is folded back in order to increase a spring length. Upper parts 721 of the spring leg portions 72-1 are bent inward in the width direction D1 at both ends of the abutting portion 71 as with the spring leg portions 72 in FIG. 15. Lower parts 722 of the spring leg portions 72-1 are bent outward in the width direction D1 from lower ends of the upper parts 721. Each of the lower parts 722 forms an acute angle to the corresponding upper part 721. Lower ends of the lower parts 722 are disposed on the bottom part 215. Boundaries 723 between the upper parts 721 and the lower parts 722 protrude inward in the width direction D1. FIGS. 16B to 16D schematically illustrate shape change of the heat collection member 70-1 by elastic deformation, based on an analysis result.

A heat collection member 70-2 illustrated in FIGS. 16F and 16G is increased in height and spring length as compared with the heat collection member 70-1. The heat collection member 70-2 exhibits behavior similar to the behavior of the heat collection member 70-1, as a spring.

Other than the above, the configurations described in the above-described embodiment can be selected or appropriately changed to other configurations without departing from the spirit of the present invention.

Figure 4:
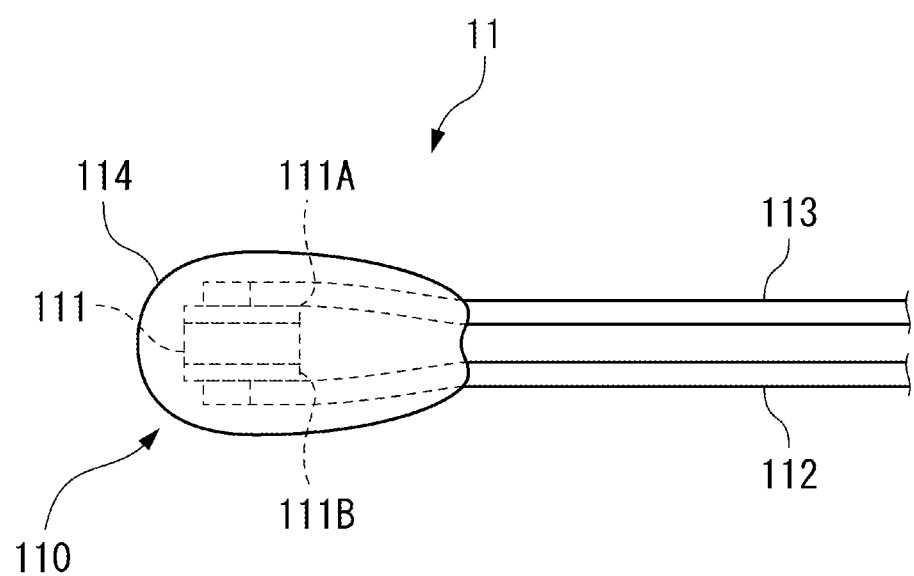
FIG. 4 is a plan view illustrating a vicinity of a thermosensitive body of a thermosensitive element.

In the embodiment and the modification described above, the case of using the thermosensitive element that has the configuration in which the lead wires 112 and 113 extend in one direction from one side of the thermosensitive body 111 as illustrated in FIG. 4 is described as an example; however, a thermosensitive element in which the lead wires 112 and 113 extend in both directions of the thermosensitive body 111 may be used. In this case, the lead wires 112 and 113 extend up to the conductive members 121 and 122 through both side surfaces 23 of the holding member 20.

Further, in the embodiment and the modification described above, the case where the lead wires 112 and 113 are drawn out from the thermosensitive body 111 in the y-direction is described as an example; however, the lead wires 112 and 113 may be drawn out from the thermosensitive body 111 in the x-direction.

The range where each of the holding member 20, the heat collection member 30, and the like is covered with each of the inner film 41 and the outer film 42, and the positions where the films 41 and 42 are fixed can be appropriately determined in consideration of the shapes of the holding member 20 and the heat collection member 30, the arrangement of the thermosensitive element 11, the required creepage distance, and the like. In a case where film materials having the same configuration are used for the inner film 41 and the outer film 42, one continuous film can be folded and piled, an inner region of the film can be used as an inner insulation portion, and an outer region can be used as an outer insulation portion.

[Example of Application to Image Forming Apparatus]

An example in which the temperature detection device 1 including the temperature sensor 10 is applied to a laser printer 9 as an example of an image forming apparatus is briefly described with reference to FIG. 17.

Note that, in place of the temperature sensor 10, the temperature sensor including any of the heat collection members illustrated in and after FIG. 14 is adoptable.

Figure 17:
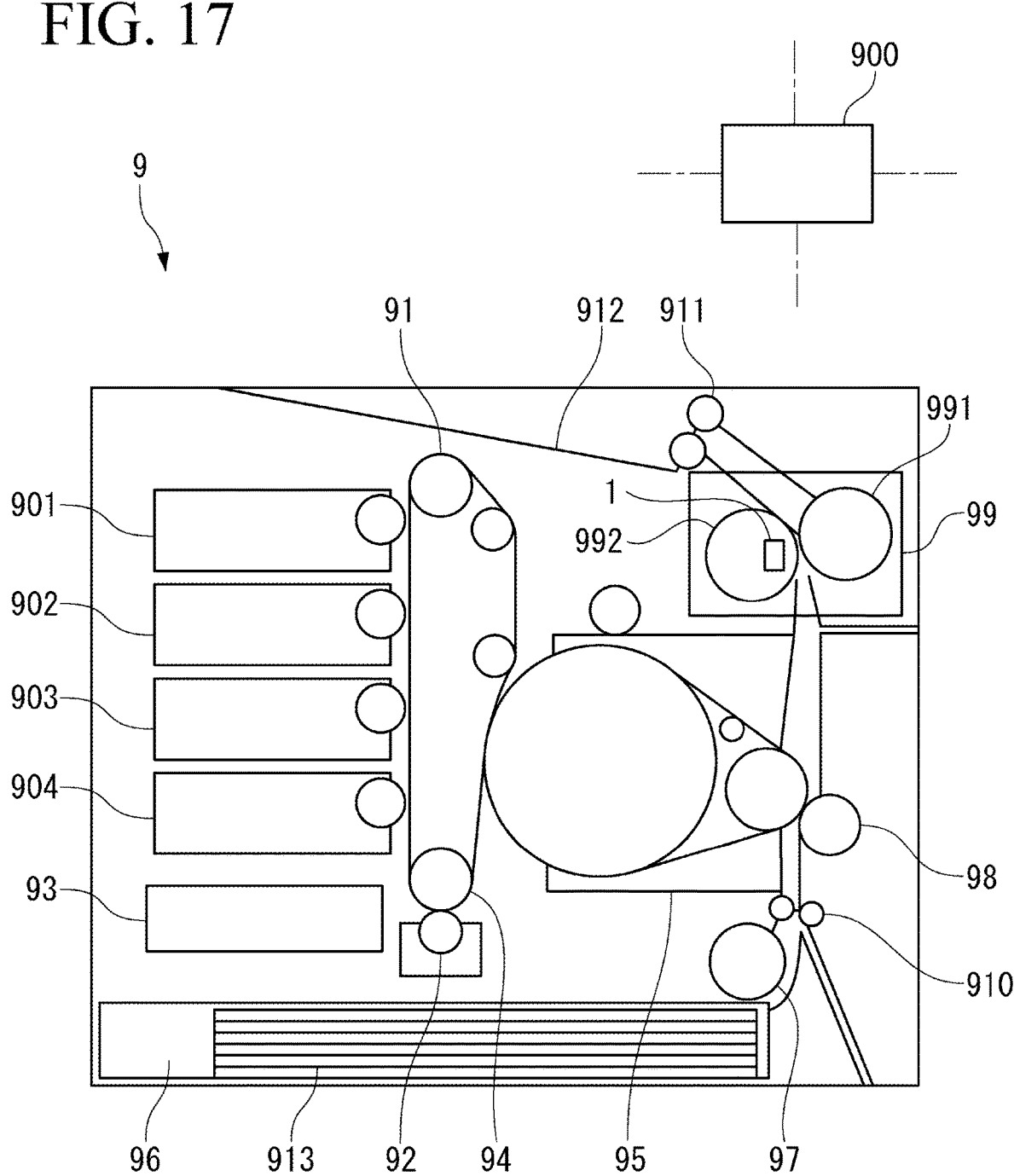
FIG. 17 is a schematic diagram illustrating an internal configuration of a printer mounted with the temperature sensor according to the present invention.

As illustrated in FIG. 17, the laser printer 9 includes a photosensitive belt 91, a charger 92, an exposure device 93, developing devices 901 to 904, a guide roller 94, an intermediate transfer unit 95, a sheet feeding cassette 96, a sheet feeding roller 97, a transfer roller 98, a fuser 99, a registration roller 910, a sheet discharge roller 911, a sheet discharge tray 912, and a control device 900 controlling the units of the laser printer 9.

The fuser 99 includes a pressure roller 991 and a heating roller 992. The heating roller 992 internally includes an unillustrated heater as a heat source.

To measure a temperature of the heater incorporated in the heating roller 92 or a temperature of a member provided in the heater, the temperature sensor 10 is installed to be pressed against the heater or the member.

In a fusing process after a charging process, an exposure process, a development process, and a transfer process that are processes for image formation by the laser printer 9, a recording sheet 913 on which a color toner image has been transferred is sent to a gap between the pressure roller 991 and the heating roller 992 of the fuser 99. When the recording sheet 913 is pressurized and heated while passing through the gap between the pressure roller 991 and the heating roller 992, the color toner image is fixed onto the recording sheet 913. Thereafter, the recording sheet 913 is discharged to the sheet discharge tray 912 through the sheet discharge roller 911.

The control device 900 controls an energization state to the heater of the heating roller 992 by using a temperature measurement value obtained by the temperature sensor 10 and the circuit unit 8 connected to the temperature sensor 10. For example, when the temperature measurement value exceeds a threshold, the control device 900 stops energization to the heater of the heating roller 992. A surface temperature of the heating roller 992 is measured by the temperature sensor 10 with high following capability. Therefore, it is possible to appropriately control the energization state of the heater without performing extra heating of the heating roller 992 by the heater in anticipation of response delay of the measurement.

Other than the above, the configurations described in the above-described embodiment can be selected or appropriately changed to other configurations without departing from the spirit of the present invention.

What is claimed is:

1. A temperature sensor used in contact with a temperature measurement object, the temperature sensor comprising:
   a thermosensitive element configured to detect a temperature of the temperature measurement object;
   a heat collection member including an abutting portion configured to abut on the temperature measurement object, and configured to be thermally joined with the thermosensitive element; and
   a holding member including a housing portion configured to house the heat collection member, wherein
   the heat collection member is swingably held by the holding member, to maintain a state where the abutting portion abuts on the temperature measurement object.

2. The temperature sensor according to claim 1, wherein the heat collection member includes the abutting portion, and paired leg portions formed integrally with the abutting portion and having tip end parts abutting on an inner surface of the housing portion formed in a concave shape.

3. The temperature sensor according to claim 2, wherein
   the housing portion includes a bottom part facing the abutting portion, and a side wall erecting from an end of the bottom part toward the abutting portion, and
   the tip end parts of the paired leg portions are disposed at corners formed by the bottom part and the side wall.

4. The temperature sensor according to claim 3, wherein
   the abutting portion and the paired leg portions are formed in a substantially U-shape as a whole by bending both sides in a longitudinal direction of a substantially rectangular metal plate, and
   the tip end parts are each formed in an arc shape.

5. A temperature detection device, comprising:
   the temperature sensor according to claim 3; and
   a circuit unit electrically connected to the temperature sensor, and configured to calculate a temperature of the temperature measurement object based on a signal from the temperature sensor.

6. An image forming apparatus of an electrophotographic system, comprising:
   a fuser configured to fix toner to a recording medium by heating and pressurization; and
   the temperature sensor according to claim 3, configured to detect a temperature of a member provided in the fuser.

7. The temperature sensor according to claim 2, wherein
   the abutting portion and the paired leg portions are formed in a substantially U-shape as a whole by bending both sides in a longitudinal direction of a substantially rectangular metal plate, and
   the tip end parts are each formed in an arc shape.

8. The temperature sensor according to claim 7, wherein each of the paired leg portions includes a leg portion main body bent relative to the abutting portion, and the tip end part bent relative to the leg portion main body in a direction opposite to a direction in which the leg portion main body is bent.

9. A temperature detection device, comprising:
   the temperature sensor according to claim 2; and
   a circuit unit electrically connected to the temperature sensor, and configured to calculate a temperature of the temperature measurement object based on a signal from the temperature sensor.

10. An image forming apparatus of an electrophotographic system, comprising:
    a fuser configured to fix toner to a recording medium by heating and pressurization; and
    the temperature sensor according to claim 2, configured to detect a temperature of a member provided in the fuser.

11. The temperature sensor according to claim 1, wherein the abutting portion is provided with an element arrangement portion where the thermosensitive element is disposed.

12. The temperature sensor according to claim 11, wherein
    the thermosensitive element includes a thermosensitive body as a main body of the thermosensitive element, and paired electric wires electrically connected to the thermosensitive body, and
    the element arrangement portion includes a thermosensitive body arrangement portion where the thermosensitive body is disposed, and an electric wire arrangement portion where the paired electric wires are disposed.

13. The temperature sensor according to claim 12, wherein the abutting portion includes the thermosensitive body arrangement portion including a through hole formed in a metal plate, and the electric wire arrangement portion including a groove formed in the metal plate.

14. The temperature sensor according to claim 1, further comprising an inner film having insulation property, between the heat collection member and the temperature measurement object, wherein
    the thermosensitive element is disposed between the inner film and the temperature measurement object.

15. The temperature sensor according to claim 14, further comprising an outer film having insulation property, between the heat collection member and the temperature measurement object, wherein
    the thermosensitive element is disposed between the inner film and the outer film.

16. A temperature detection device, comprising:
    the temperature sensor according to claim 1; and
    a circuit unit electrically connected to the temperature sensor, and configured to calculate a temperature of the temperature measurement object based on a signal from the temperature sensor.

17. An image forming apparatus of an electrophotographic system, comprising:
    a fuser configured to fix toner to a recording medium by heating and pressurization; and
    the temperature sensor according to claim 1, configured to detect a temperature of a member provided in the fuser.

* * * * *